(12) United States Patent
Cottonaro

(10) Patent No.: US 11,668,425 B1
(45) Date of Patent: Jun. 6, 2023

(54) PUSH SEAL PIPE ADAPTER

(71) Applicant: RTF Components LLC, San Carlos, CA (US)

(72) Inventor: Joshua Pierre Cottonaro, Belmont, CA (US)

(73) Assignee: RTF COMPONENTS LLC, San Carlos, CA (US)

(*) Notice: Subject to any disclaimer, the term of this patent is extended or adjusted under 35 U.S.C. 154(b) by 0 days.

(21) Appl. No.: 17/830,226

(22) Filed: Jun. 1, 2022

Related U.S. Application Data

(60) Provisional application No. 63/202,219, filed on Jun. 1, 2021.

(51) Int. Cl.
*F16L 41/08* (2006.01)
*F16L 5/10* (2006.01)

(52) U.S. Cl.
CPC ............ *F16L 41/088* (2013.01); *F16L 5/10* (2013.01)

(58) Field of Classification Search
CPC . F16L 41/088; F16L 5/10; F16L 19/07; F16L 19/075; F16L 25/14; F16L 55/1152; F16L 17/032
See application file for complete search history.

(56) References Cited

U.S. PATENT DOCUMENTS

| | | | | |
|---|---|---|---|---|
| 3,325,174 A | * | 6/1967 | Weaver | F16J 15/106 |
| | | | | 277/625 |
| 3,627,355 A | * | 12/1971 | Reddy | F16L 17/032 |
| 4,991,858 A | * | 2/1991 | Abi | F16L 41/088 |
| | | | | 277/606 |
| 5,029,879 A | * | 7/1991 | Strang, Sr. | F16L 41/088 |
| | | | | 277/606 |
| 2011/0278835 A1 | * | 11/2011 | Kishi | F16L 17/032 |
| 2020/0080672 A1 | * | 3/2020 | DeGooyer | F16L 55/1152 |

FOREIGN PATENT DOCUMENTS

EP     3249277 A1 * 11/2017 ............ F16L 41/088

\* cited by examiner

*Primary Examiner* — Zachary T Dragicevich
(74) *Attorney, Agent, or Firm* — Honigman LLP

(57) ABSTRACT

A push seal pipe adapter includes a grommet and a pipe adapter. The grommet fits inside the pipe adapter. The grommet includes a first adapter contact surface, a second adapter contact surface, and a third adapter contact surface. The pipe adapter includes a first grommet contact surface, a second grommet contact surface, and a third grommet contact surface. When the grommet is inserted into the pipe adapter, the first adapter contact surface of the grommet contacts the first grommet contact surface of the pipe adapter and the second adapter contact surface of the grommet contacts the second grommet contact surface of the pipe adapter. The push seal pipe adapter provides a pipe coupling end that receives a pipe. To couple, the pipe is pushed into the pipe coupling end.

19 Claims, 35 Drawing Sheets

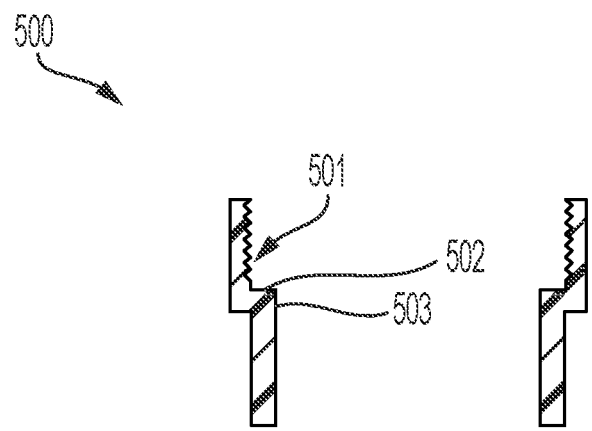
FIG. 25
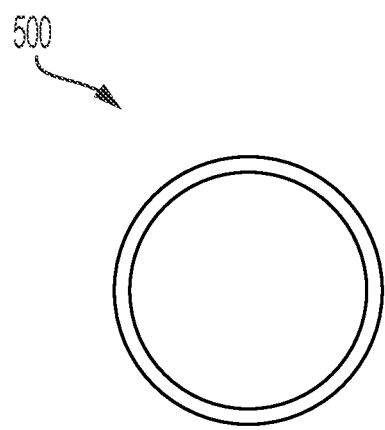
FIG. 26   FIG. 27

PUSH SEAL PIPE ADAPTER

CROSS-REFERENCE TO RELATED APPLICATIONS

This application claims the benefit under 35 U.S.C. § 119 of U.S. provisional application Ser. No. 63/202,219, entitled "Push Seal Pipe Adapter," filed on Jun. 1, 2021. The subject matter of the foregoing document is expressly incorporated herein by reference.

TECHNICAL FIELD

The present invention relates generally to fluid conveyance systems, and more specifically, to pipe adapters.

BACKGROUND INFORMATION

Plumbing provides systems for conveying fluids in a wide variety of applications. Pipes and valves are commonly involved in such systems. Pipe adapters are typically used to connect two pipes together. Different pipe adapters are used depending on the application and the type of pipes that are being connected together.

SUMMARY

A push seal pipe adapter includes a grommet and a pipe adapter. The grommet fits inside the pipe adapter. The grommet includes a first adapter contact surface, a second adapter contact surface, and a third adapter contact surface. The pipe adapter includes a first grommet contact surface, a second grommet contact surface, and a third grommet contact surface. When the grommet is inserted into the pipe adapter, the first adapter contact surface of the grommet contacts the first grommet contact surface of the pipe adapter and the second adapter contact surface of the grommet contacts the second grommet contact surface of the pipe adapter. The push seal pipe adapter provides a convenient and reliable pipe coupling end that receives a pipe. To couple, the pipe is pushed into the pipe coupling end. No extra labor or adapters are needed to securely seal the pipe and the push seal pipe adapter.

In operation, the push seal pipe adapter is useful in any plumbing application where fittings or components need to be changed rapidly or in a semi-permanent setting without glue, threads, or other sealants. The push seal pipe adapter provides a robust and repeatable seal without needing any conventional pipe adapters or costly labor. Different applications include commercial and residential plumbing systems, test beds in laboratories, trade show displays, or semi-permanent dwelling or workspaces.

Novel push seal pipe adapters are offered in an assembled or packaged fashion. Push seal pipe adapter components may be sold together or separately. The novel grommet is manufactured to be interchangeable with other pipe adapters usable in different applications. Instructions are optionally provided that instruct users on how to assemble or use the novel push seal pipe adapter.

In accordance with at least one novel aspect, the grommet creates at least three sealing surfaces with the pipe adapter and another sealing surface with a pipe inserted through the grommet. A first seal is formed between the first adapter contact surface of the grommet and the first grommet contact surface of the pipe adapter. A second seal is formed between the second adapter contact surface of the grommet and the second grommet contact surface of the pipe adapter. After a pipe is inserted into an assembled push seal pipe adapter, a third seal is formed between the third adapter contact surface of the grommet and the third grommet contact surface of the pipe adapter. A fourth seal is formed between an interior circumference of the grommet and the inserted pipe.

The novel grommet is adaptable across all sizes and shapes of pipe adapters depending on the application. Each sealing surface provided by the grommet extends circumferentially. The three sealing surfaces between the grommet and pipe adapter are disposed along an outer surface of the grommet. The sealing surface between the grommet and an insertable pipe is disposed along an interior surface of the grommet. The grommet is formed from any malleable or non-rigid materials, such as rubber, silicon, or plastic. Use of such materials ensure that the third adapter contact surface of the grommet expands towards and presses against the third grommet contact surface of the pipe adapter, thereby ensuring optimal sealing. In another embodiment, the grommet is formed from at least two materials that include a rigid material, such as metal, and a non-rigid material, such as rubber. The non-rigid portion provides necessary expansion to provide all four novel seals.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 25 is a diagram of a cross-sectional view of a press fit push seal pipe adapter 500.

FIG. 26 is a diagram of a top cross-sectional view of the press fit push seal pipe adapter 500.

FIG. 27 is a diagram of a bottom cross-sectional view of the press fit push seal pipe adapter 500.

DETAILED DESCRIPTION

Reference will now be made in detail to some embodiments of the invention, examples of which are illustrated in the accompanying drawings. In the description and claims, terms such as "top" or "bottom" are used to describe relative orientations between different parts of novel embodiments of a push seal pipe adapter, and it is to be understood that the overall structure being described can actually be oriented in any way in three-dimensional space. In the description and claims, terms such as "pipe fitting" and "fitting" are used to describe various components that could be attached to a push seal pipe adapter. It is to be understood that "pipe fitting" and "fitting" may refer to various pipe fittings, such as tee, wye, elbows, reducers, junctions, unions, couplings, crosses, adapters, olets, plugs, caps, or valves, sections of pipe, or other components common to plumbing systems.

Figure 1:
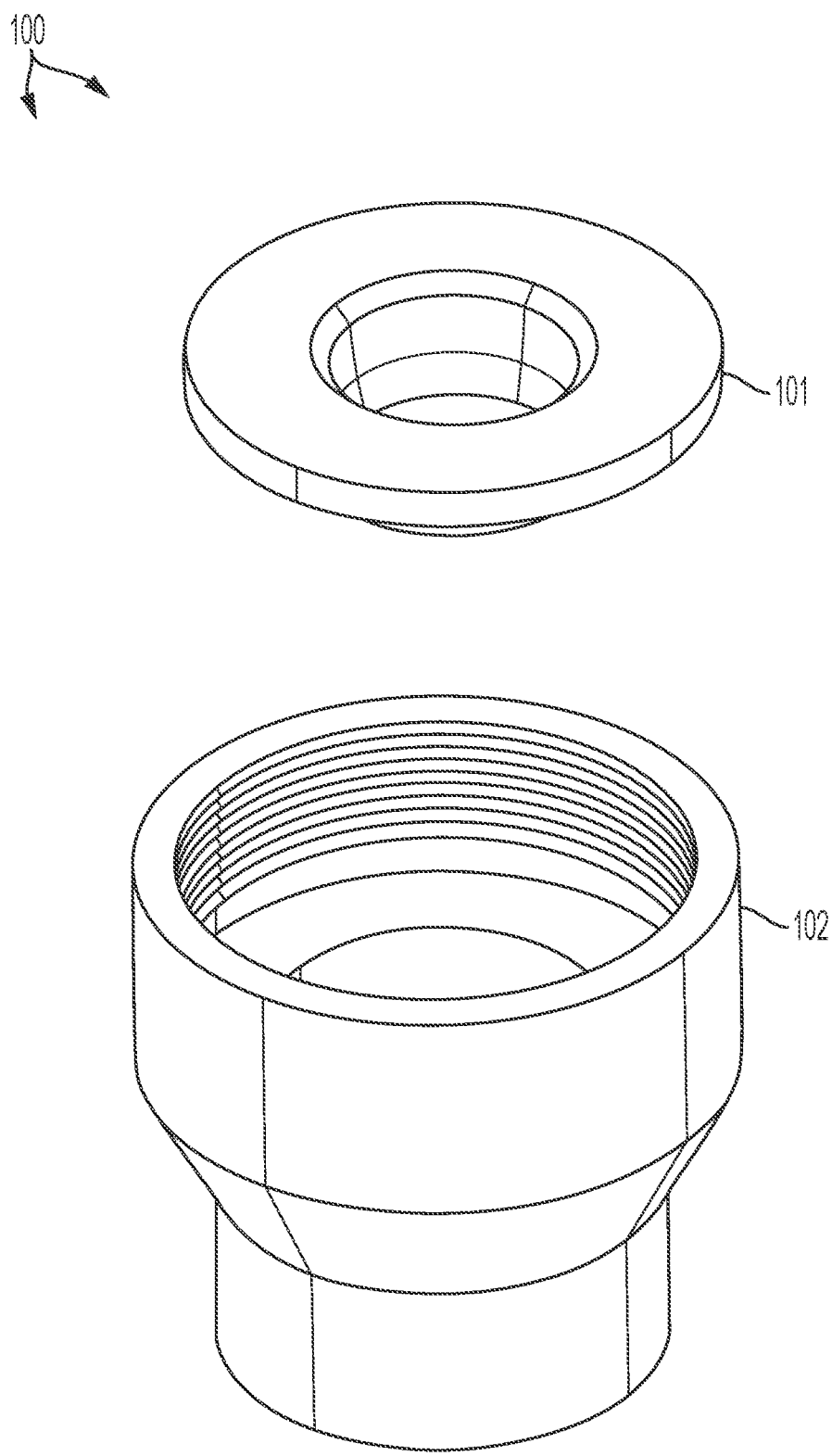
FIG. 1 is a diagram of a perspective and exploded view of a push seal pipe adapter 100.

FIG. 1 is a diagram of a perspective and exploded view of a push seal pipe adapter 100. A push seal pipe adapter 100 comprises a grommet 101 and a pipe adapter 102. The grommet 101 fits within the pipe adapter 102. In FIG. 1, the grommet 101 is shown above the pipe adapter 102.

Figure 2:
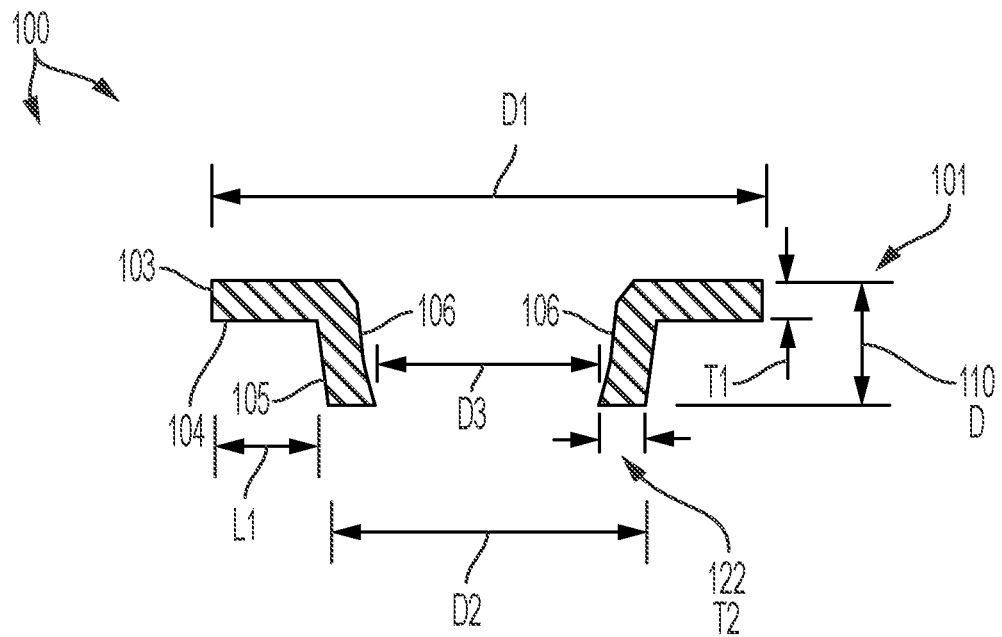
FIG. 2 is a diagram of an exploded cross sectional view of the push seal pipe adapter 100.
Figure 2:
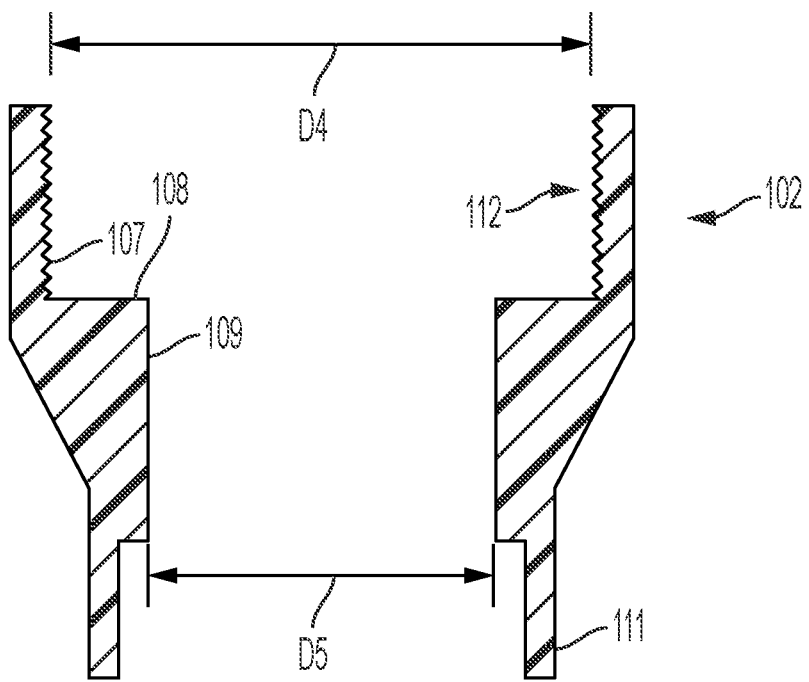

FIG. 2 is a diagram of an exploded cross-sectional view of the push seal pipe adapter 100. Grommet 101 and pipe adapter 102 are in the same relative orientation as in FIG. 1. Grommet 101 comprises first adapter contact surface 103, second adapter contact surface 104, third adapter contact surface 105, pipe surface contact 106, and grommet thickness 122. The first adapter contact surface 103 of grommet 101 extends in a circular fashion, forming a first diameter that extends a first distance D1. The third adapter contact surface 105 of grommet 101 extends in a circular fashion, forming a second diameter that extends a second distance D2.

The grommet thickness 122 creates an inner diameter of the grommet 101 that extends a distance D3. The first distance D1 is greater than the second distance D2. The third adapter contact surface 105 extends perpendicular to the circular area created by the first diameter. A grommet depth 110 extends from one side of the grommet 101 to an opposite side of the grommet 101. Second adapter contact surface 104 is perpendicular to first adapter contact surface 103. The first adapter contact surface 103 is substantially parallel (+/−25 degrees) to the third contact surface 105.

In accordance with at least one novel aspect, the grommet 101 has shape and dimensions that provide significant advancements in pipe adapter sealing. The first adapter contact surface 103 has a thickness T1. The depth 110 D is greater than the thickness T1 of the first adapter contact surface 103, thereby providing adequate sealing functionality against an interior of the pipe adapter 102. This relationship ensures that the third contact surface 105 extends adequately to seal and engage the third grommet contact surface 109 of the pipe adapter 102. In addition, the inner diameter D3 of the grommet 101 is greater than the length L1 of the second adapter contact surface 104, thereby providing an adequate perpendicular seal within the pipe adapter 102. In one embodiment, the depth 110 D is at least twice T1. In another embodiment, the depth 110 D is at three times T1. In yet another embodiment, the inner diameter D3 is more than one and a half times the length L1. In still another embodiment, the inner diameter D3 is more than two times the length L1. In still yet another embodiment, the inner diameter D3 is more than three times the length L1.

Pipe adapter 102 comprises a first pipe coupling end, a second pipe coupling end opposite the first pipe coupling end, a first grommet contact surface 107, a second grommet contact surface 108, a third grommet contact surface 109, a pipe contact surface 111, and threads 112. In the embodiment shown in FIG. 2, the first pipe coupling end is threaded, and the second pipe coupling end is smooth. In another embodiment, the first end may be smooth, straight, threaded, tapered, or shaped to accommodate a pipe or pipe fitting, and the second end may be smooth, straight, threaded, tapered, or shaped to accommodate a pipe or pipe fitting. Any combination of first coupling end attachment configurations and second coupling end attachment configurations may be used to accommodate any fittings to be joined by the push seal pipe adapter 100. First pipe coupling end and second pipe coupling end attach to other pipes or fittings via press fit attachment, threaded attachment, or adhesive attachment. The diameter of the first pipe coupling end is equal to the fourth distance D4. The inner diameter of the third grommet contact surface of pipe adapter 102 is equal to the fifth distance D5. The distance D4 is greater than the distance D5. In this embodiment, the second pipe coupling end is straight and smooth, as shown by pipe contact surface 111.

Figure 3:
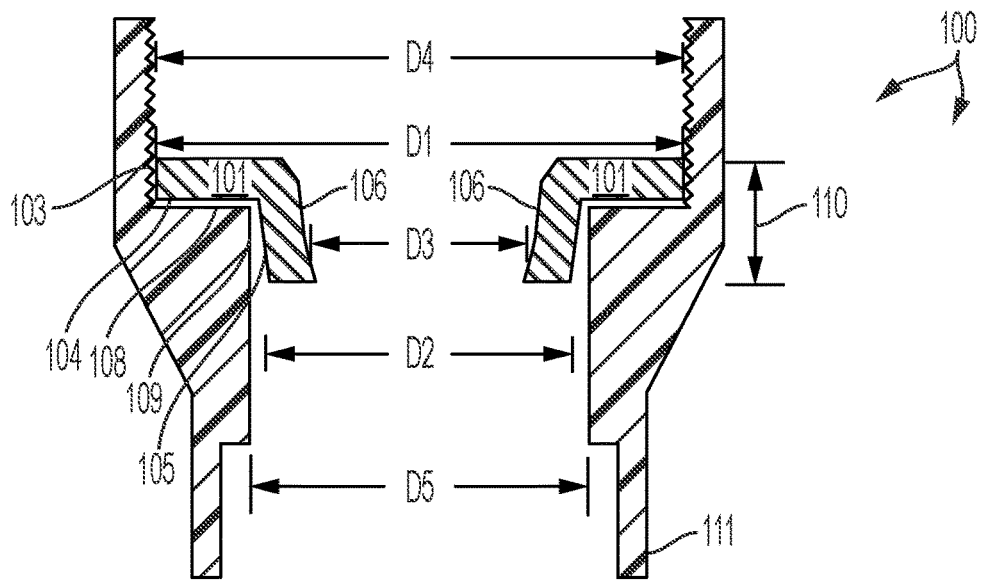
FIG. 3 is a diagram of a cross-sectional view of the push seal pipe adapter 100 with grommet 101 inserted into pipe adapter 102.

FIG. 3 is a diagram of a cross-sectional view of the push seal pipe adapter 100 with grommet 101 inserted into pipe adapter 102. The first adapter contact surface 103 is in contact with first grommet contact surface 107, the second adapter contact surface 104 is in contact with second grommet contact surface 108. In this embodiment, not all of the third adapter contact surface 105 is in contact with the third grommet contact surface 109. The third adapter contact surface 105 is tapered, slanting away from the third grommet contact surface 109. In this embodiment, distance D1 is equal to distance D4. In another embodiment, distance D1 is smaller than distance D4. In yet another embodiment, distance D1 is larger than distance D4. In still yet another embodiment, all of the third adapter contact surface 105 is in contact with the third grommet contact surface 109.

Figure 4:
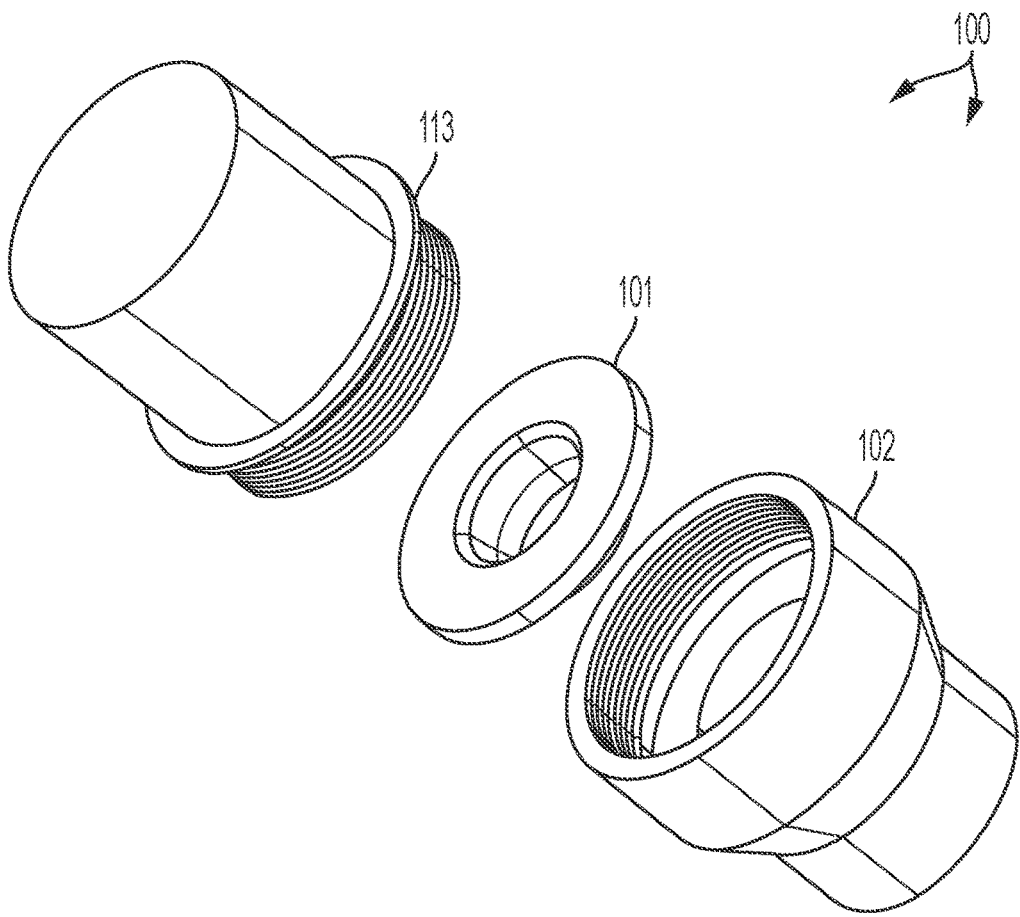
FIG. 4 is a diagram of an exploded perspective view of the push seal pipe adapter 100 with test cap 113.

FIG. 4 is a diagram of an exploded perspective view of the push seal pipe adapter 100 with test cap 113. Test cap 113 is made to mate with a threaded end of pipe adapter 102. Grommet 101 is inserted into pipe adapter 102. Test cap 113 is then threaded into the threaded end of pipe adapter 102. Test cap 113 is turned until it contacts grommet 101. Test cap 113 is then tightened against grommet 101 until a seal is formed between test cap 113 and grommet 101, and between grommet 101 and pipe adapter 102, thereby forming a seal between test cap 113 and pipe adapter 102.

Figure 5:
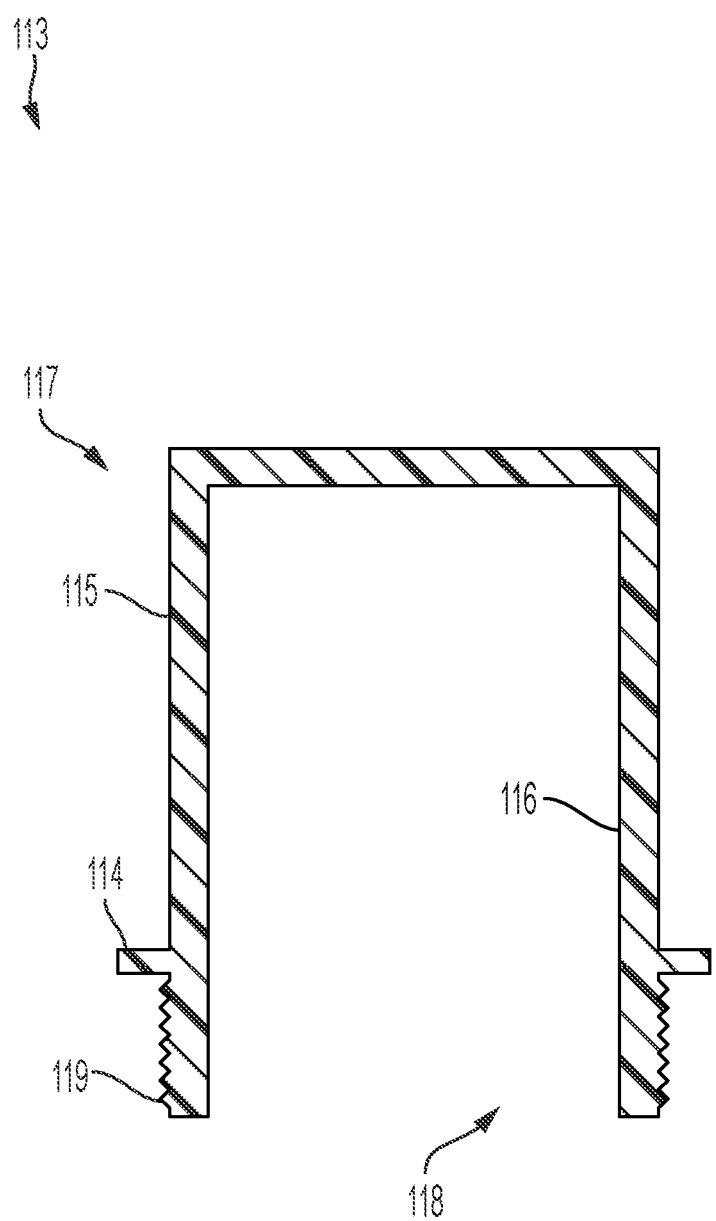
FIG. 5 is a diagram of a cross-sectional view of test cap 113.

FIG. 5 is a diagram of a cross-sectional view of test cap 113. Test cap 113 comprises a hollow cylinder with a closed end 117 and an open end 118 opposite the closed end 117. The open end 118 includes threads 119 around the circumference of the cylinder. The threads 119 extend along at least part of the length of the cylinder. In one embodiment, threads 119 are disposed on the outer circumference of the hollow cylinder. In another embodiment, threads 119 are disposed on the inner circumference of the cylinder. In the embodiment shown in FIG. 5, a flange 114 extends away from and perpendicular to the outer surface 115 of the cylinder. In another embodiment, flange 114 is not included.

Figure 6:
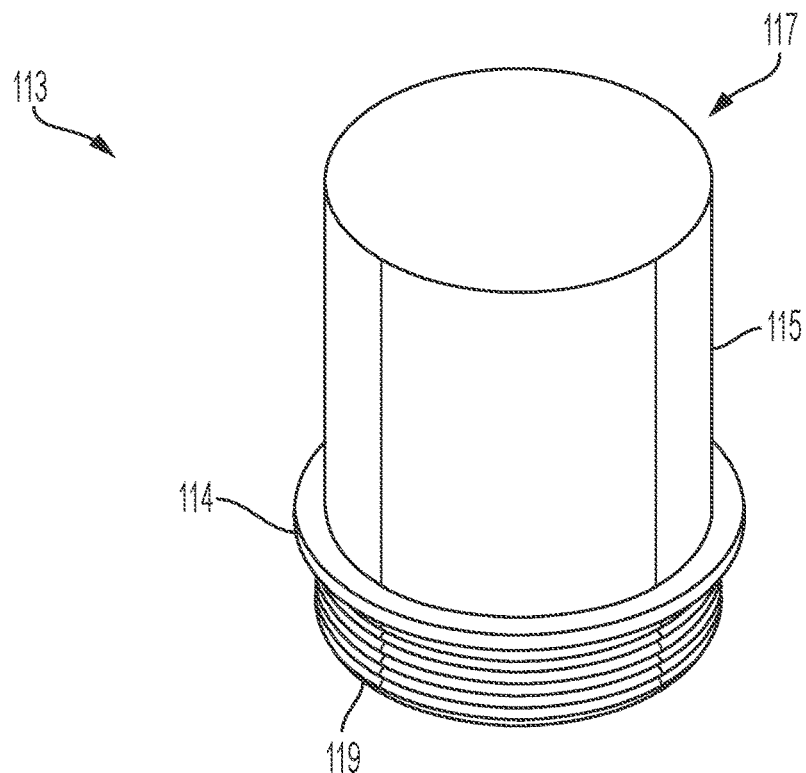
FIG. 6 is a diagram of a top perspective view of test cap 113.

FIG. 6 is a diagram of a top perspective view of test cap 113. Flange 114, outer surface 115, closed end 117, and threads 119 are shown.

Figure 7:
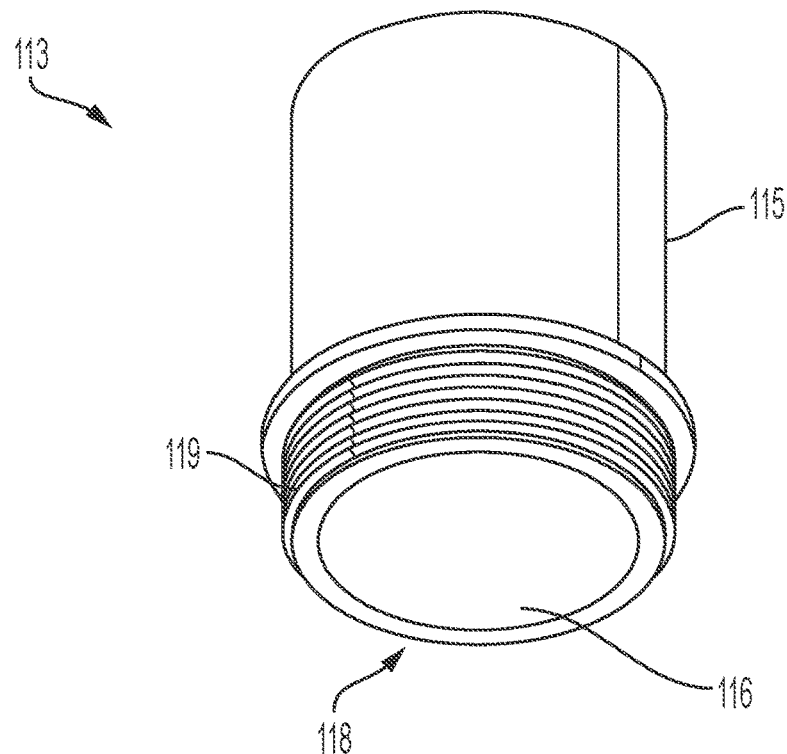
FIG. 7 is a diagram of a bottom perspective view of test cap 113.

FIG. 7 is a diagram of a bottom perspective view of test cap 113. Flange 114, outer surface 115, inner surface 116, open end 118, and threads 119 are shown.

Figure 8:
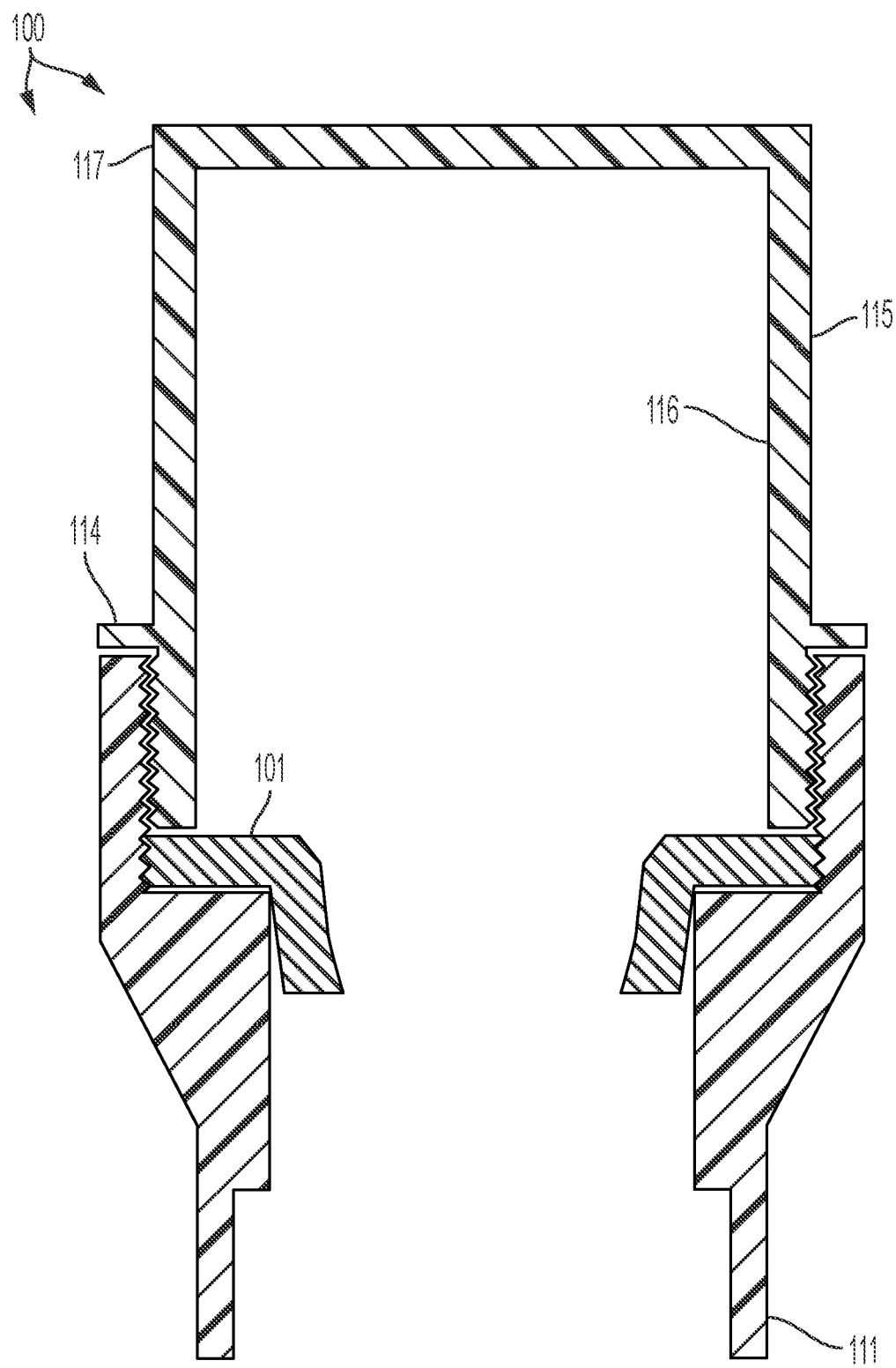
FIG. 8 is a diagram of a cross-sectional view of the push seal pipe adapter 100 after attachment of test cap 113.

FIG. 8 is a diagram of a cross-sectional view of the push seal pipe adapter 100 after attachment of the test cap 113. Grommet 101 is inserted into the threaded end of pipe adapter 102 and test cap 113 threaded on to the threaded end of pipe adapter 102.

To install a push seal pipe adapter 100, grommet 101 is inserted into pipe adapter 102. In this embodiment, test cap 113 is then threaded into the threaded end of pipe adapter 102. Test cap 113 is turned, engaging the threads, until the open end 118 contacts grommet 101. Test cap 113 is then tightened against grommet 101 until a seal is formed between test cap 113 and grommet 101 and between second adapter surface 104 and second grommet contact surface 108. When grommet 101 is compressed by test cap 113 against second grommet contact surface 108, grommet 101 also expands laterally. This lateral expansion compresses first adapter contact surface 103 against first grommet contact surface 107, forming a seal. The compression of grommet 101 between test cap 113 and pipe adapter 102 forms a seal between test cap 113 and pipe adapter 102.

Figure 9:
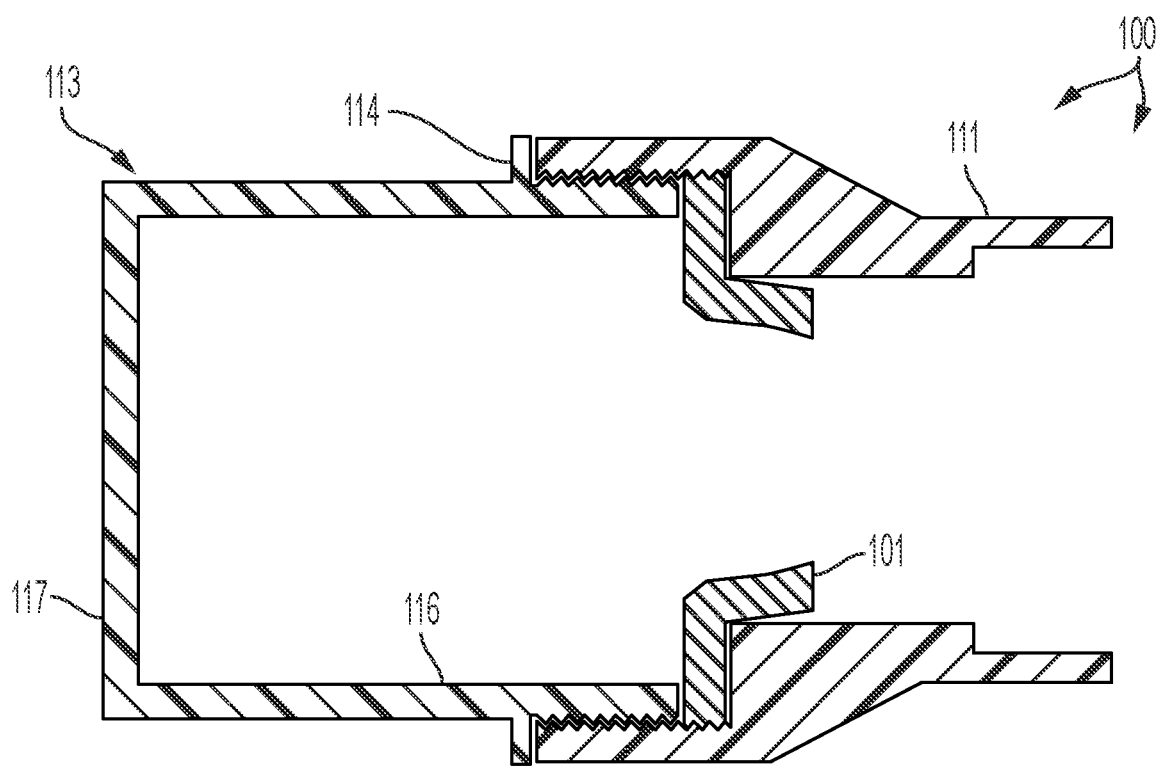
FIG. 9 is a diagram of a cross-sectional view of the push seal pipe adapter 100 after attachment of test cap 113.

FIG. 9 is a diagram of a cross-sectional view of the push seal pipe adapter 100 after attachment of test cap 113. Grommet 101 is inserted into pipe adapter 102 and test cap 113 is threaded on to the threaded end of pipe adapter 102. Grommet 101 is compressed between test cap 113 and pipe adapter 102, forming a sealed connection between test cap 113 and pipe adapter 102. The push seal pipe adapter 100 and test cap 113 unit is now attached to a pipe or pipe fitting. Framing, drywall, or other structural or finishing work through which plumbing must pass may be completed. Test cap 113 also provides protection to the interior of the push seal pipe adapter 100 and the plumbing system 5, preventing dust or other contaminants from entering the interior of the push seal pipe adapter 100 while structural or finishing work is completed. Following finishing work, a portion of test cap 113 extends beyond the finishing. If the test cap 113 is installed and the push seal pipe adapter 100 is connected to a plumbing system, such as plumbing system 5 (see FIGS. 13-14), the connection may be tested for integrity as part of the plumbing system testing.

Figure 10:
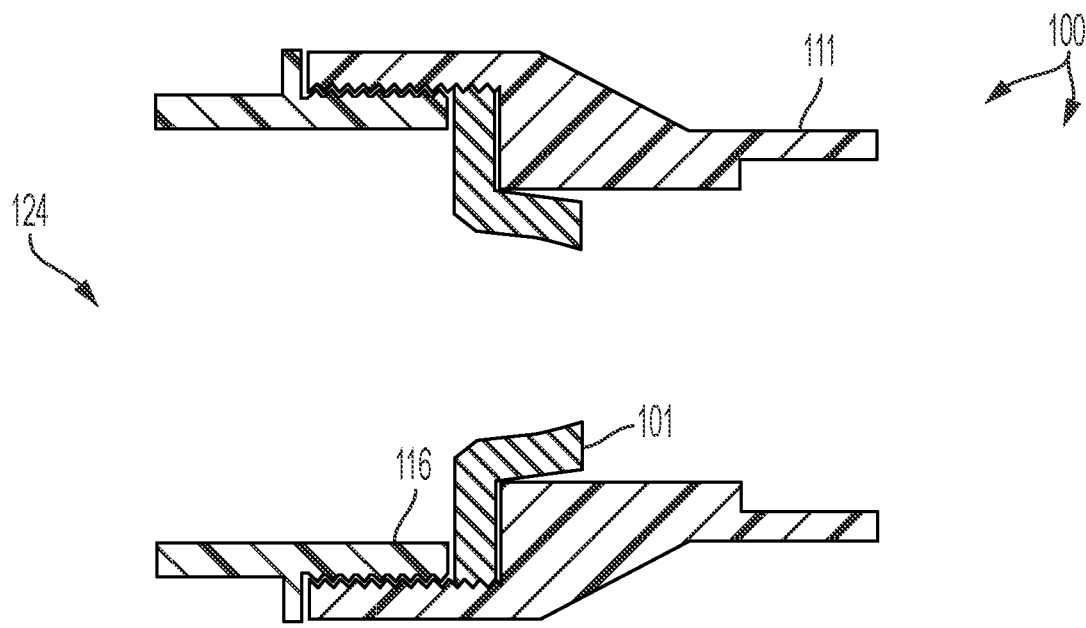
FIG. 10 is a diagram of a cross-sectional view of the push seal pipe adapter 100 after test cap 113 has been trimmed.

FIG. 10 is a diagram of a cross-sectional view of the push seal pipe adapter 100 after test cap 113 has been trimmed. In FIG. 10, the closed end 117 of test cap 113 shown in FIG. 9 has been removed, creating trimmed end 124. After finishing work and integrity testing of the plumbing system is complete, test cap 113 is trimmed to a length to suit the user's needs. After trimming, the user now has access to the interior of push seal pipe adapter 100 through trimmed end 124. The user that installs a push seal pipe adapter 100, the user that completes structural and/or finishing work, and the user that trims test cap 113 need not be the same individual. Tradesmen do not need to communicate or coordinate with other tradesmen to effectively use push seal pipe adapter 100 and/or test cap 113. Labor costs are significantly reduced by utilizing push seal pipe adapter 100 in various applications.

Figure 11:
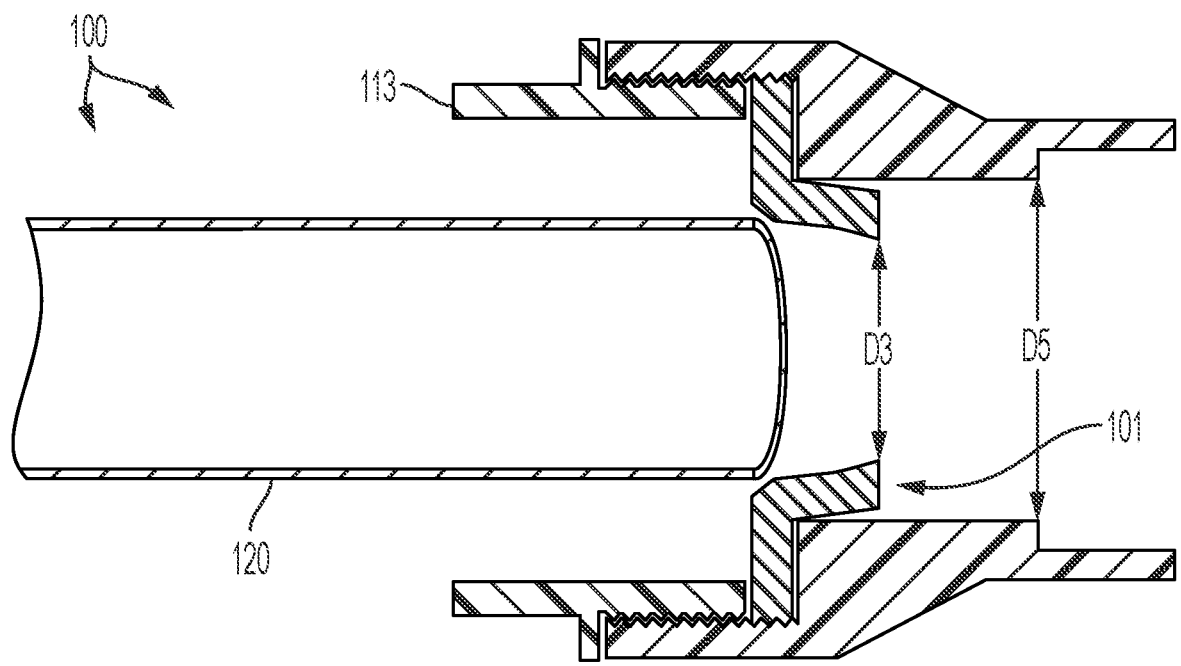
FIG. 11 is a diagram of a cross-sectional view of the push seal pipe adapter 100 and a pipe 120 before the pipe 120 is inserted into the push seal pipe adapter 100.

FIG. 11 is a diagram of a cross-sectional view of the push seal pipe adapter 100 and a pipe 120 before the pipe 120 is inserted into the push seal pipe adapter 100. The pipe 120 is a hollow cylinder with an outside diameter equal to or slightly greater than the third distance D3, but not greater than the fifth distance D5.

Figure 12:
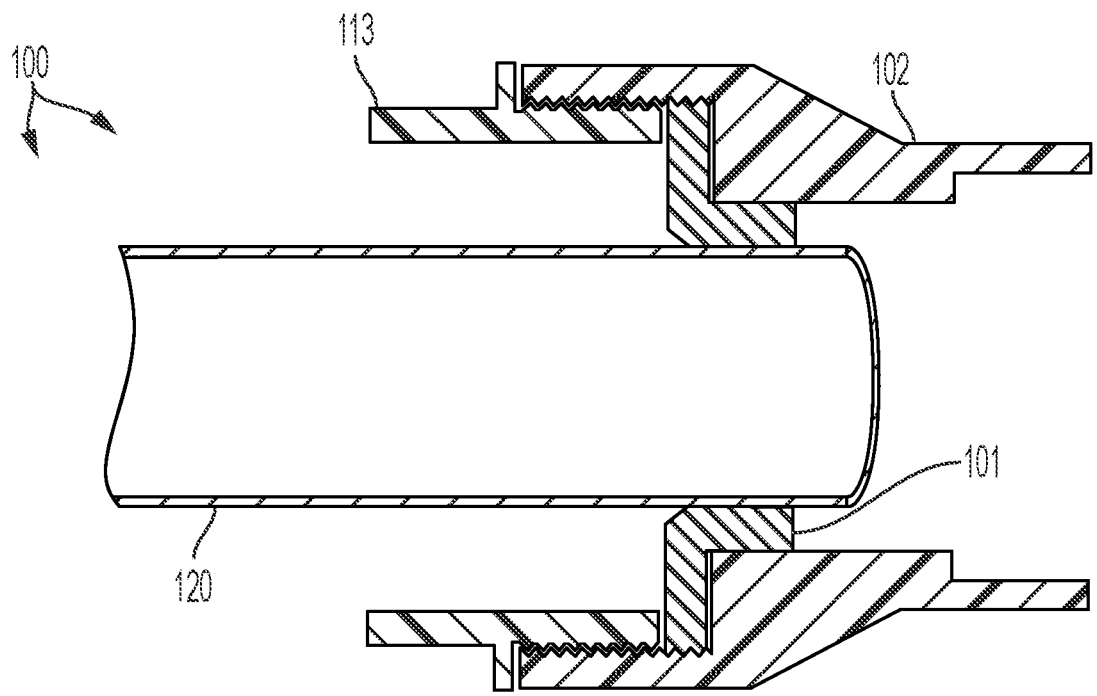
FIG. 12 is a diagram of a cross-sectional view of the push seal pipe adapter 100 and pipe 120 after the pipe 120 is inserted into the push seal pipe adapter 100.

FIG. 12 is a diagram of a cross-sectional view of the push seal pipe adapter 100 and pipe 120 after the pipe 120 is inserted into the push seal pipe adapter 100. The pipe 120 is pushed into the push seal pipe adapter 100 and the end of the pipe is pushed past the end of grommet 101. The outer surface of pipe 120 is in contact with pipe surface contact 106. This action also compresses the grommet 101 against the third grommet contact surface 109 of pipe adapter 102. The compression of the grommet 101 between the outer surface of pipe 120 and third grommet surface 109 forms a seal between the pipe 120 and the push seal pipe adapter 100, creating a sealed coupling between the pipe 120 and pipe adapter 102. The pipe 120 may be pushed any length past the end of grommet 101, provided there is no obstruction beyond the pipe adapter 102, and the pipe 120 is of sufficient length.

Figure 13:
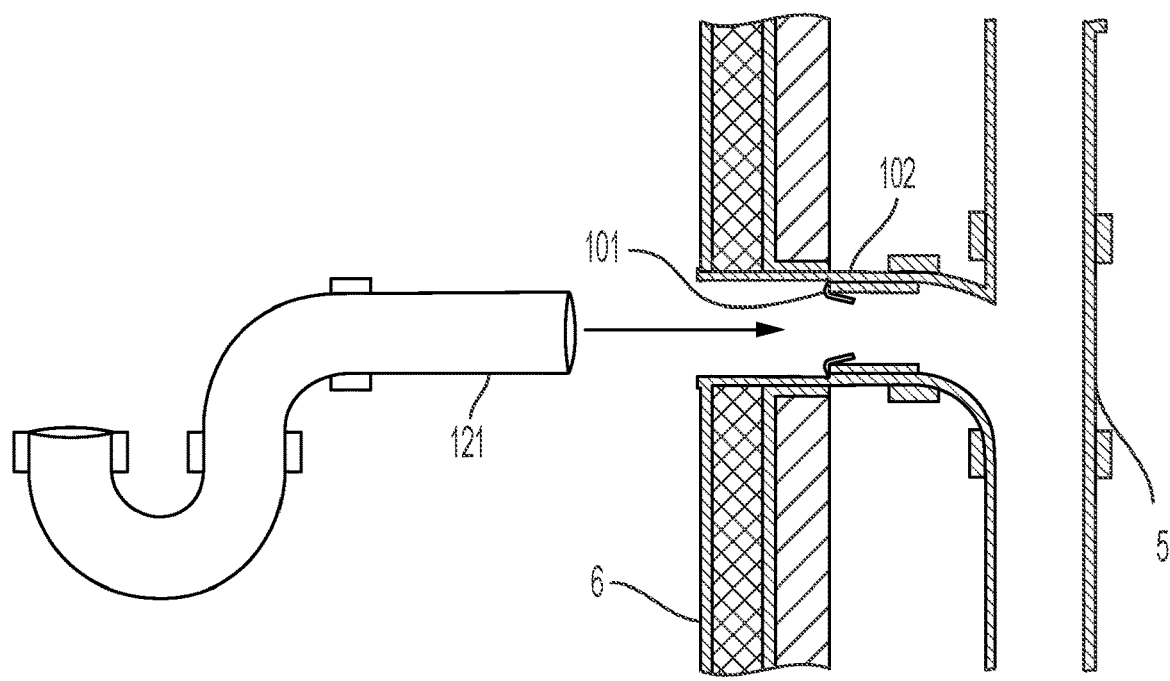
FIG. 13 is a diagram of a cross-sectional view of the push seal pipe adapter 100 connected to a plumbing system 5 and installed within a finished wall 6.

FIG. 13 is a diagram of a cross-sectional view of the push seal pipe adapter 100 connected to a plumbing system 5 and installed within a finished wall 6. A U-bend trap 121 is shown prior to insertion. An arrow indicates the direction in which the U-bend trap 121 will be inserted.

Figure 14:
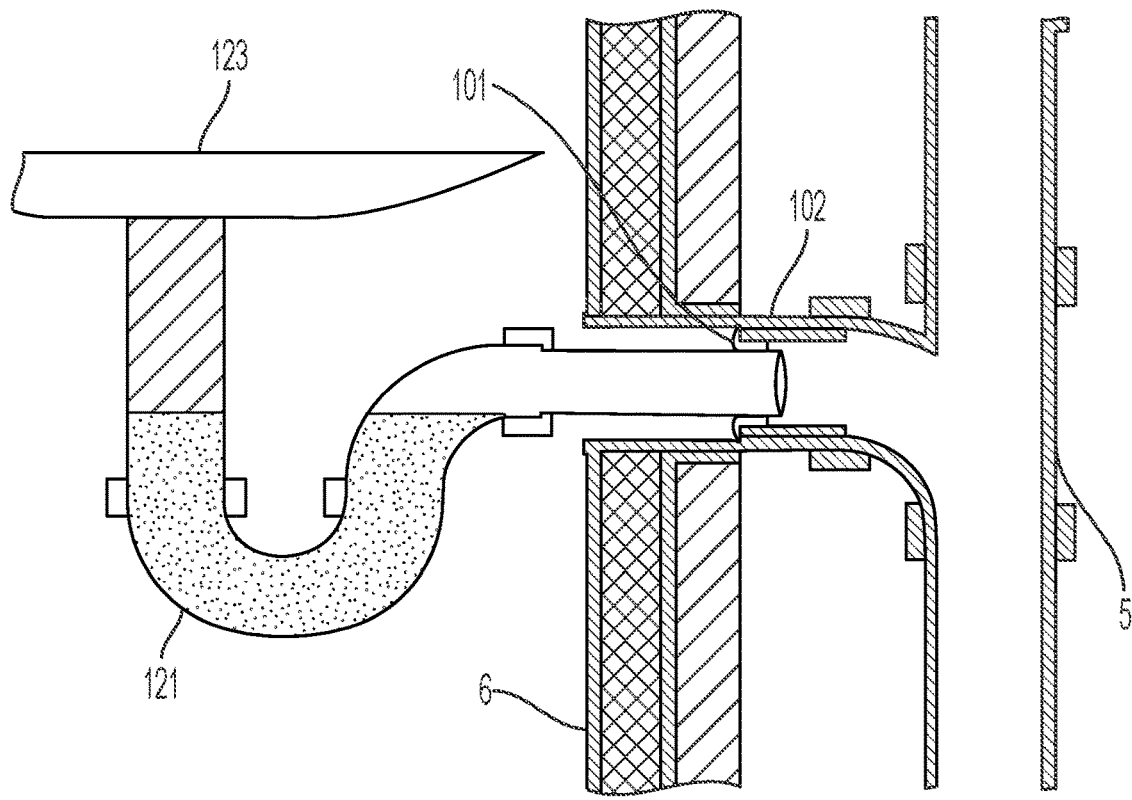
FIG. 14 is a diagram of a cross-sectional view of the push seal pipe adapter 100 installed.

FIG. 14 is a diagram of a cross-sectional view of the push seal pipe adapter 100 installed and in use. Push seal pipe adapter 100 is connected to a plumbing system 5, and installed within a finished wall 6. U-bend trap 121 is connected to a plumbing fixture 123, and is inserted into push seal pipe adapter 100.

Figure 15:
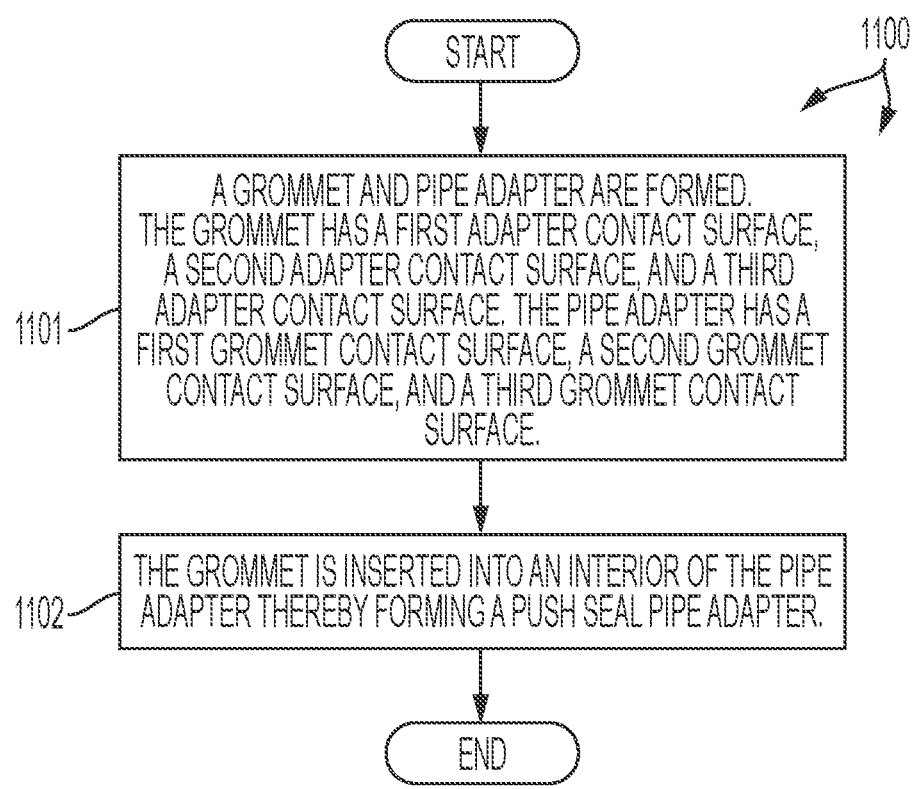
FIG. 15 is a flowchart of a method 1100 in accordance with one novel aspect.

FIG. 15 is a flowchart of a method 1100 in accordance with one novel aspect. In a first step (step 1101), a grommet and pipe adapter are formed. The grommet has a first adapter contact surface, a second adapter contact surface, and a third adapter contact surface. The pipe adapter has a first grommet contact surface, a second grommet contact surface, and a third grommet contact surface. In a second step (step 1102), the grommet is inserted into an interior of the pipe adapter, thereby forming a push seal pipe adapter.

Figure 16:
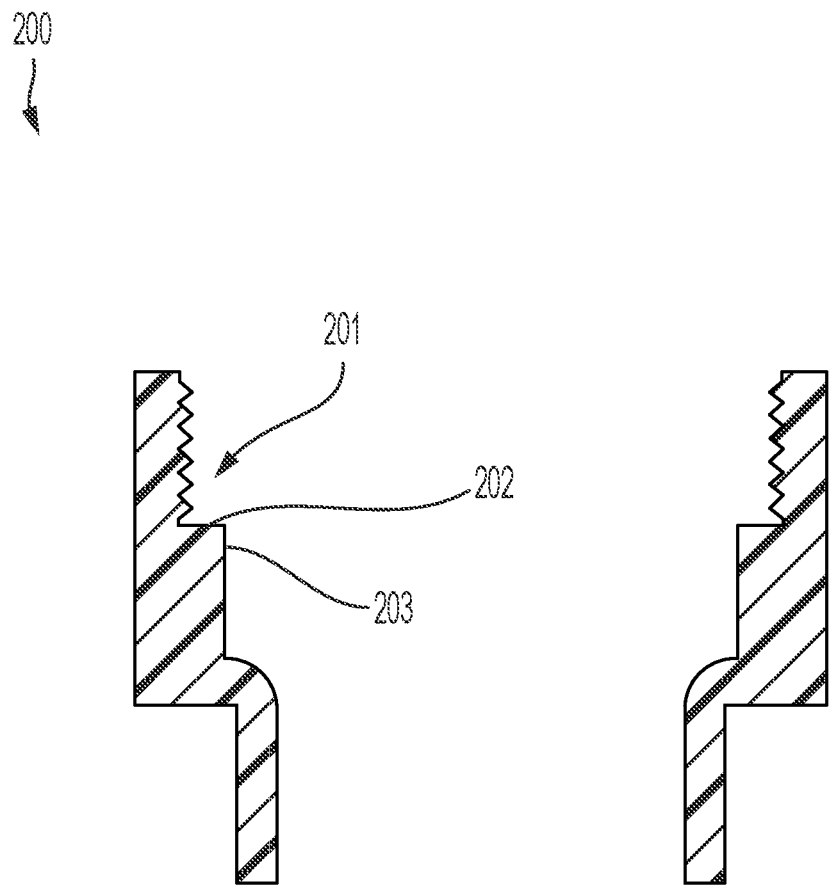
FIG. 16 is a diagram of a cross-sectional view of a press fit push seal pipe adapter 200.

FIG. 16 is a diagram of a cross-sectional view of a press fit push seal pipe adapter 200. The press fit push seal pipe adapter 200 has a first grommet contact surface 201, a second grommet contact surface 202, and a third grommet contact surface 203. A novel grommet in accordance with various embodiments above is inserted into the press fit push seal pipe adapter 200. When inserted, the grommet (not shown) is in contact and forms a seal with first grommet contact surface 201 and the grommet is in contact and forms a seal with the second grommet contact surface 202. After a pipe is inserted into press fit push seal pipe adapter 200, the grommet contacts and forms a seal with third grommet contact surface 203. The grommet forms a seal with the pipe inserted into the press fit push seal pipe adapter 200.

Figure 17:
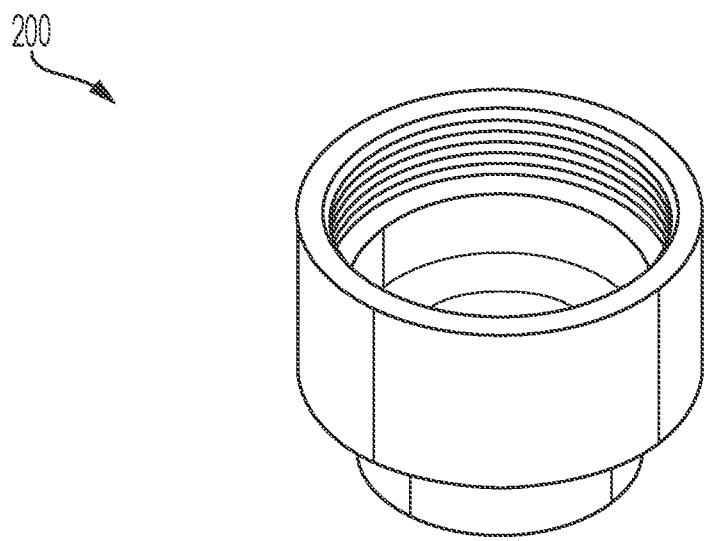
FIG. 17 is a diagram of a top perspective view of the press fit push seal pipe adapter 200.

FIG. 17 is a diagram of a top perspective view of the press fit push seal pipe adapter 200.

Figure 18:
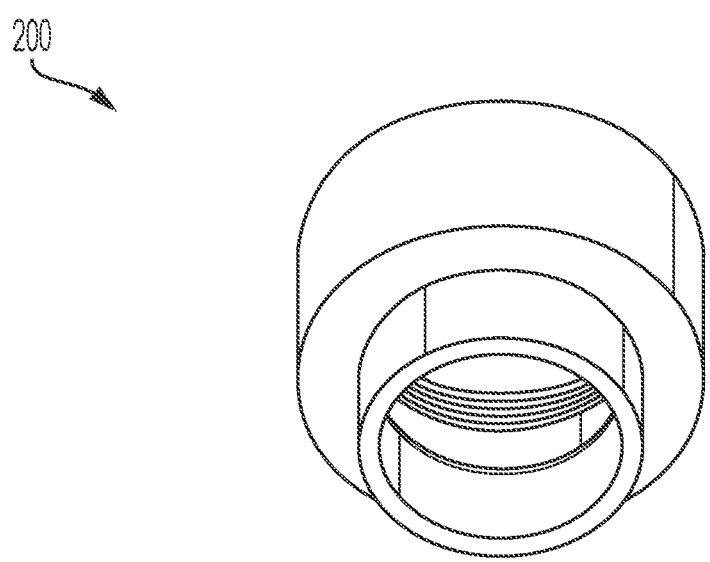
FIG. 18 is a diagram of a bottom perspective view of the press fit push seal pipe adapter 200.

FIG. 18 is a diagram of a bottom perspective view of the press fit push seal pipe adapter 200.

Figure 19:
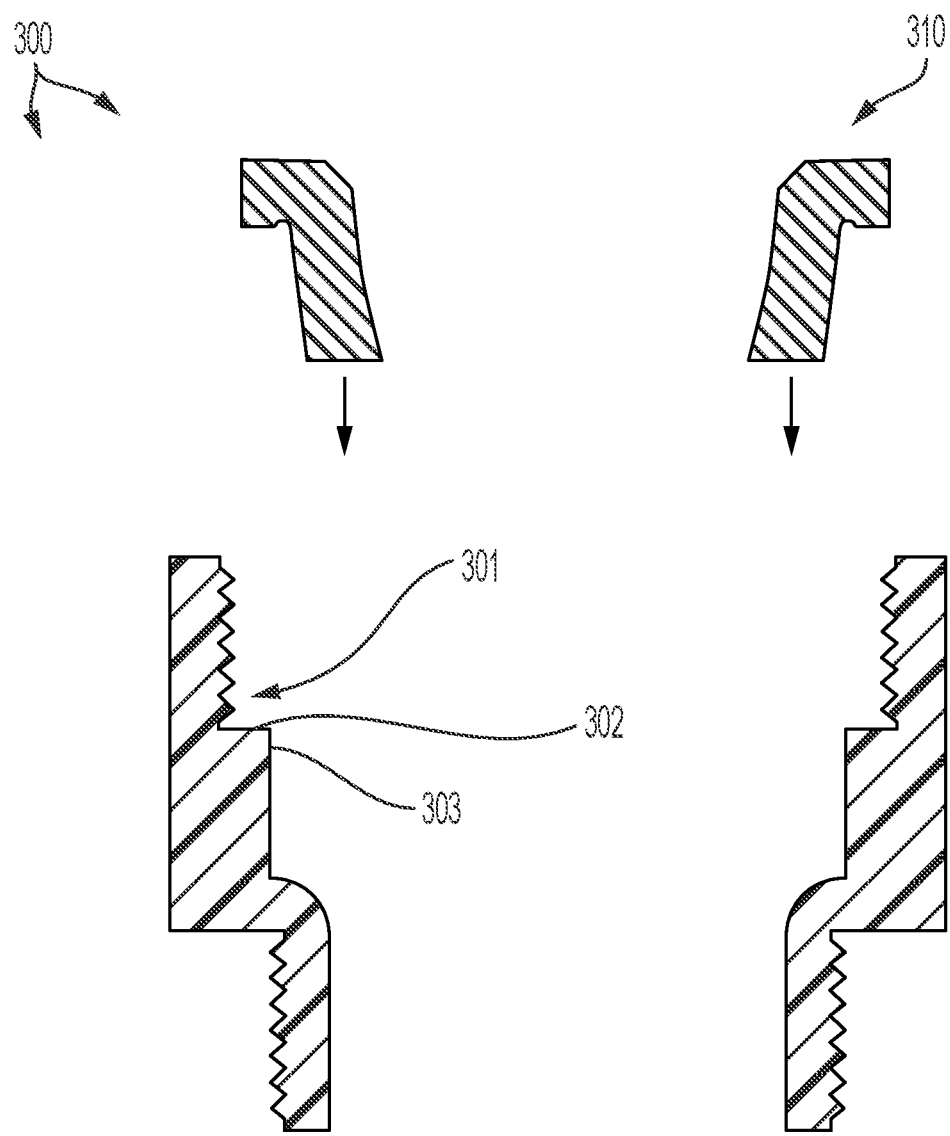
FIG. 19 is a diagram of a cross-sectional view of a threaded push seal pipe adapter 300.

FIG. 19 is a diagram of a cross-sectional view of a threaded push seal pipe adapter 300. The threaded push seal pipe adapter 300 has a first grommet contact surface 301, a second grommet contact surface 302, and a third grommet contact surface 303. A grommet 310 in accordance with various embodiments above is inserted into the threaded push seal pipe adapter 300. When inserted, the grommet 310 is in contact and forms a seal with first grommet contact surface 301 and the grommet 310 is in contact and forms a seal with the second grommet contact surface 302. After a pipe is inserted into threaded push seal pipe adapter 300, the grommet 310 contacts and forms a seal with third grommet contact surface 303. The grommet 310 forms a seal with the pipe inserted into the threaded push seal pipe adapter 300.

Figure 20:
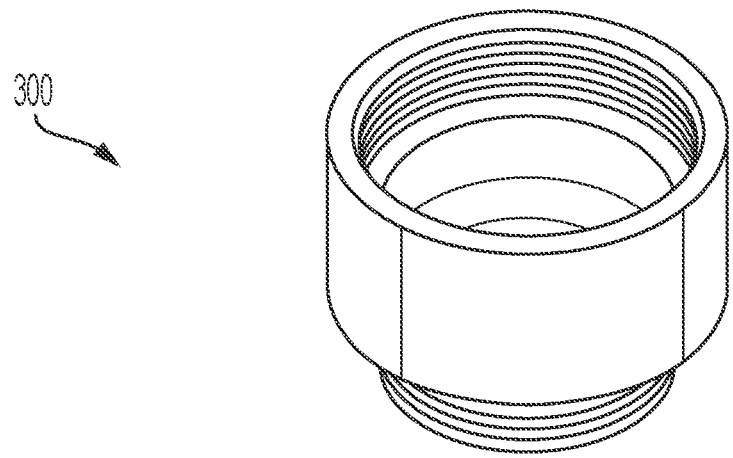
FIG. 20 is a diagram of a top perspective view of the threaded push seal pipe adapter 300.

FIG. 20 is a diagram of a top perspective view of the threaded push seal pipe adapter 300.

Figure 21:
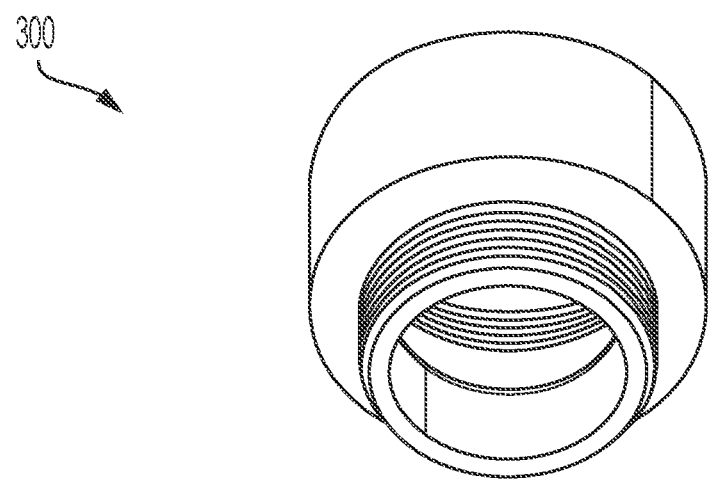
FIG. 21 is a diagram of a bottom perspective view of the threaded push seal pipe adapter 300.

FIG. 21 is a diagram of a bottom perspective view of the threaded push seal pipe adapter 300.

Figure 22:
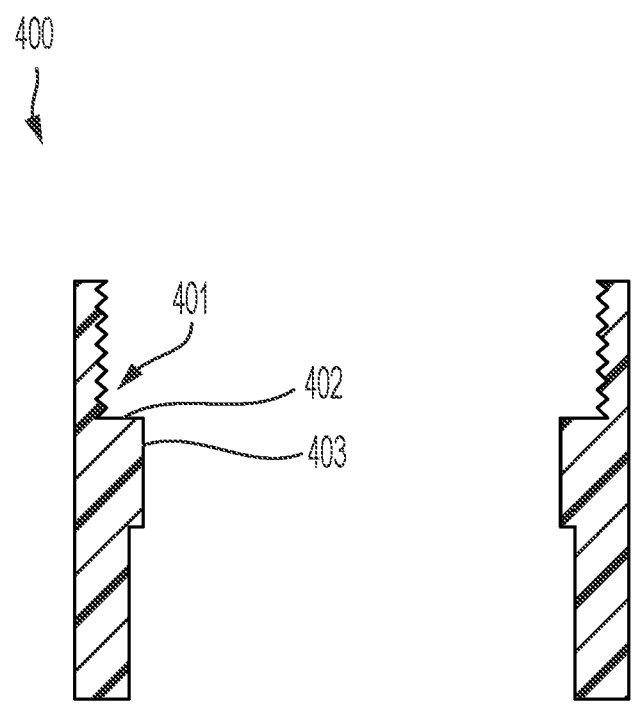
FIG. 22 is a diagram of a cross-sectional view of a press fit push seal pipe adapter 400.

FIG. 22 is a diagram of a cross-sectional view of a press fit push seal pipe adapter 400. The press fit push seal pipe adapter 400 has a first grommet contact surface 401, a second grommet contact surface 402, and a third grommet contact surface 403. A novel grommet in accordance with various embodiments above is inserted into the press fit push seal pipe adapter 400. When inserted, the grommet (not shown) is in contact and forms a seal with first grommet contact surface 401 and the grommet is in contact and forms a seal with the second grommet contact surface 402. After a pipe is inserted into press fit push seal pipe adapter 400, the grommet contacts and forms a seal with third grommet contact surface 403. The grommet forms a seal with the pipe inserted into the press fit push seal pipe adapter 400.

Figure 23:
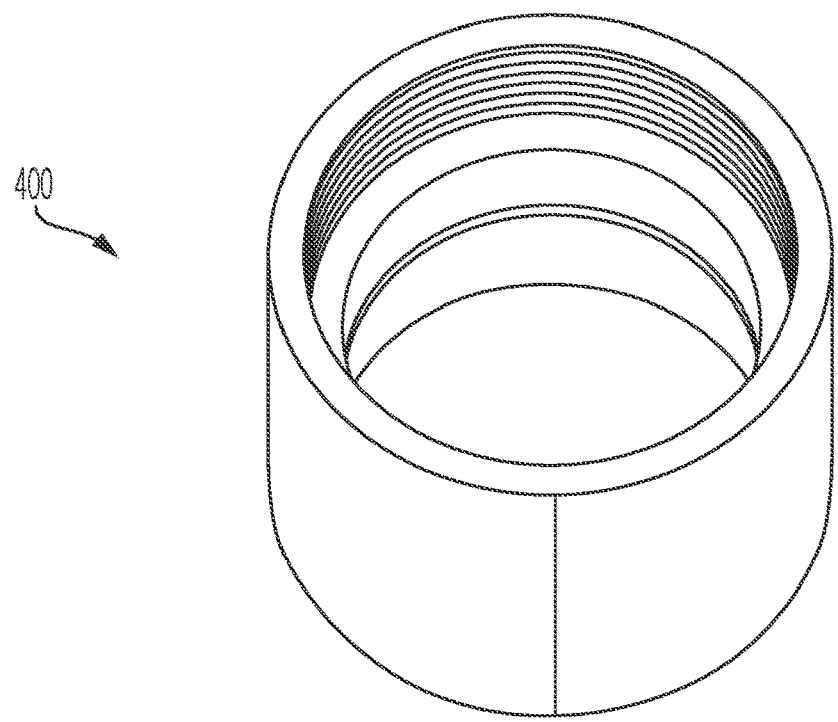
FIG. 23 is a diagram of a top perspective view of the press fit push seal pipe adapter 400.

FIG. 23 is a diagram of a top perspective view of the press fit push seal pipe adapter 400.

Figure 24:
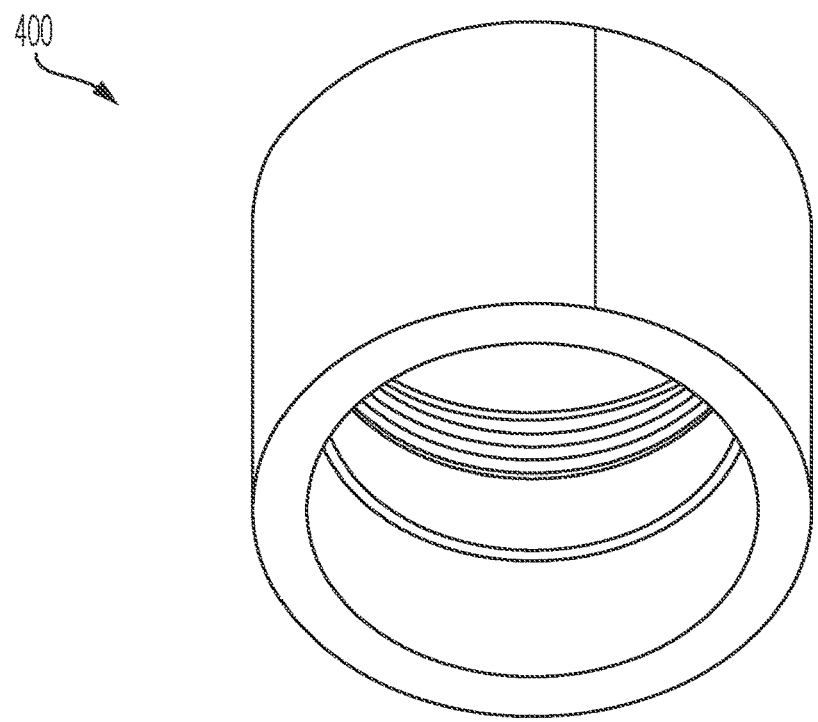
FIG. 24 is a diagram of a bottom perspective view of the press fit push seal pipe adapter 400.

FIG. 24 is a diagram of a bottom perspective view of the press fit push seal pipe adapter 400.

FIG. 25 is a diagram of a cross-sectional view of a press fit push seal pipe adapter 500. The press fit push seal pipe adapter 500 has a first grommet contact surface 501, a second grommet contact surface 502, and a third grommet contact surface 503. A novel grommet in accordance with various embodiments above is inserted into the press fit push seal pipe adapter 500. When inserted, the grommet (not shown) is in contact and forms a seal with first grommet contact surface 501 and the grommet is in contact and forms a seal with the second grommet contact surface 502. After a pipe is inserted into press fit push seal pipe adapter 500, the grommet contacts and forms a seal with third grommet contact surface 503. The grommet forms a seal with the pipe inserted into the press fit push seal pipe adapter 500.

FIG. 26 is a diagram of a top cross-sectional view of the press fit push seal pipe adapter 500.

FIG. 27 is a diagram of a bottom cross-sectional view of the press fit push seal pipe adapter 500.

Figure 28:
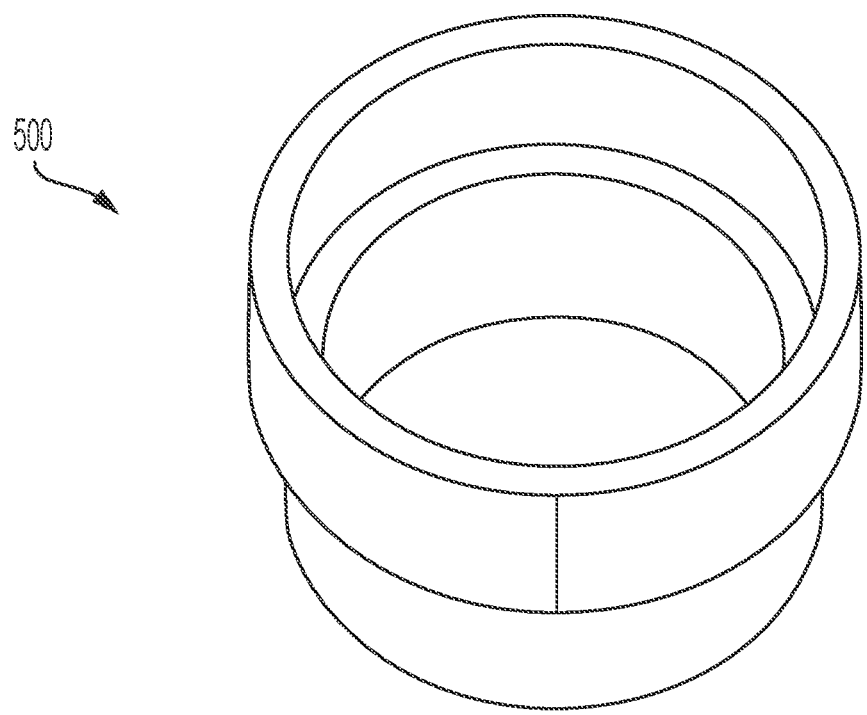
FIG. 28 is a diagram of a top perspective view of the press fit push seal pipe adapter 500.

FIG. 28 is a diagram of a top perspective view of the press fit push seal pipe adapter 500.

Figure 29:
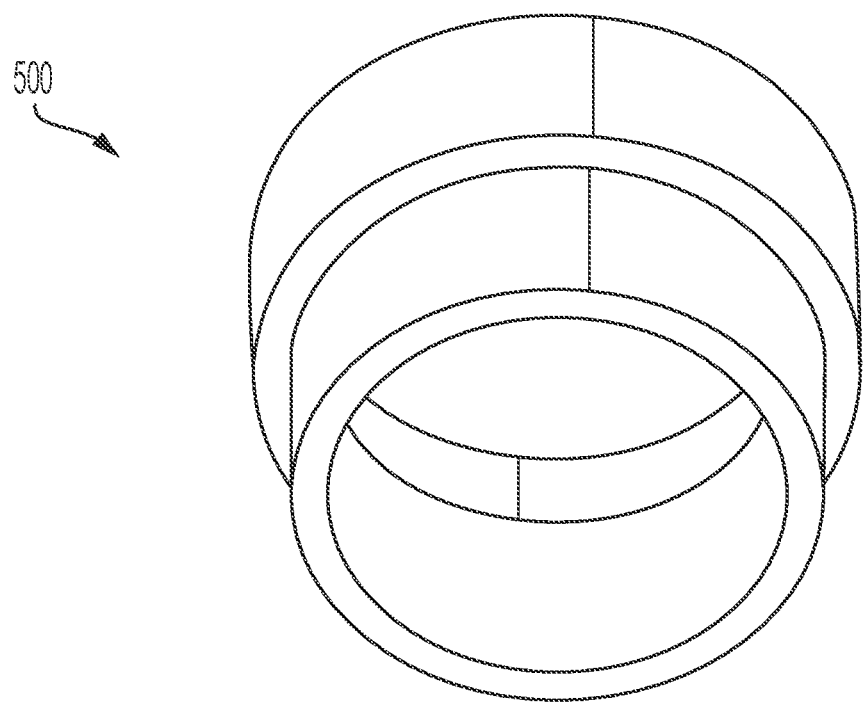
FIG. 29 is a diagram of a bottom perspective view of the press fit push seal pipe adapter 500.

FIG. 29 is a diagram of a bottom perspective view of the press fit push seal pipe adapter 500.

Figure 30:
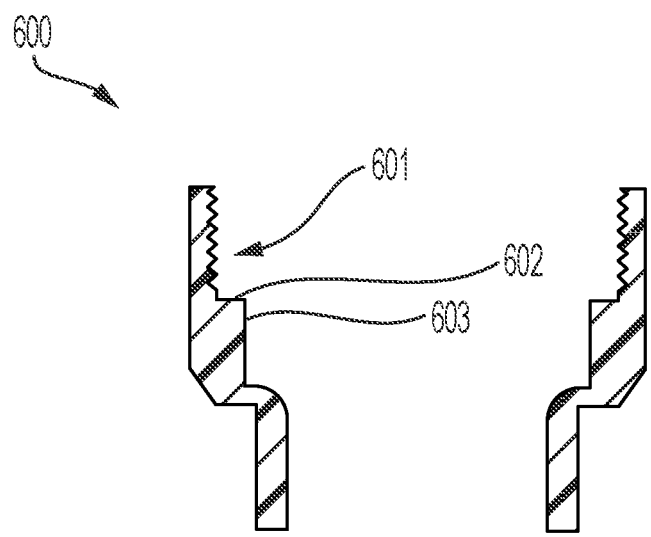
FIG. 30 is a diagram of cross-sectional view of a press fit push seal pipe adapter 600.

FIG. 30 is a diagram of a cross-sectional view of a press fit push seal pipe adapter 600. The press fit push seal pipe adapter 600 has a first grommet contact surface 601, a second grommet contact surface 602, and a third grommet contact surface 603. A novel grommet in accordance with various embodiments above is inserted into the press fit push seal pipe adapter 600. When inserted, the grommet (not shown) is in contact and forms a seal with first grommet contact surface 601 and the grommet is in contact and forms a seal with the second grommet contact surface 602. After a pipe is inserted into the press fit push seal pipe adapter 600, the grommet contacts and forms a seal with third grommet contact surface 603. The grommet forms a seal with the pipe inserted into the press fit push seal pipe adapter 600.

Figure 31:
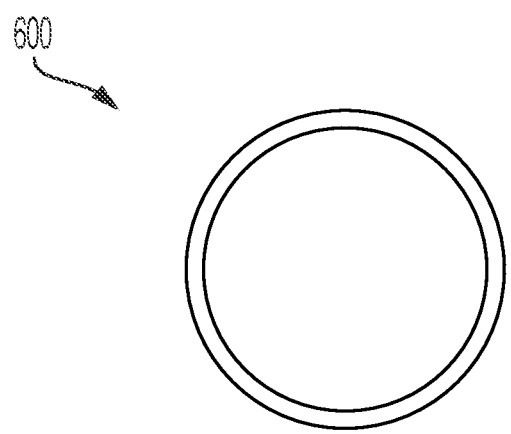
FIG. 31 is a diagram of a top cross-sectional view of the press fit push seal pipe adapter 600.

FIG. 31 is a diagram of a top cross-sectional view of the press fit push seal pipe adapter 600.

Figure 32:
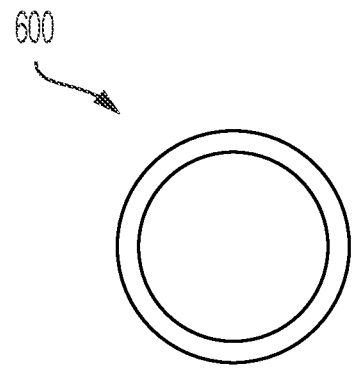
FIG. 32 is a diagram of a bottom cross-sectional view of the press fit push seal pipe adapter 600.

FIG. 32 is a diagram of a bottom cross-sectional view of the press fit push seal pipe adapter 600.

Figure 33:
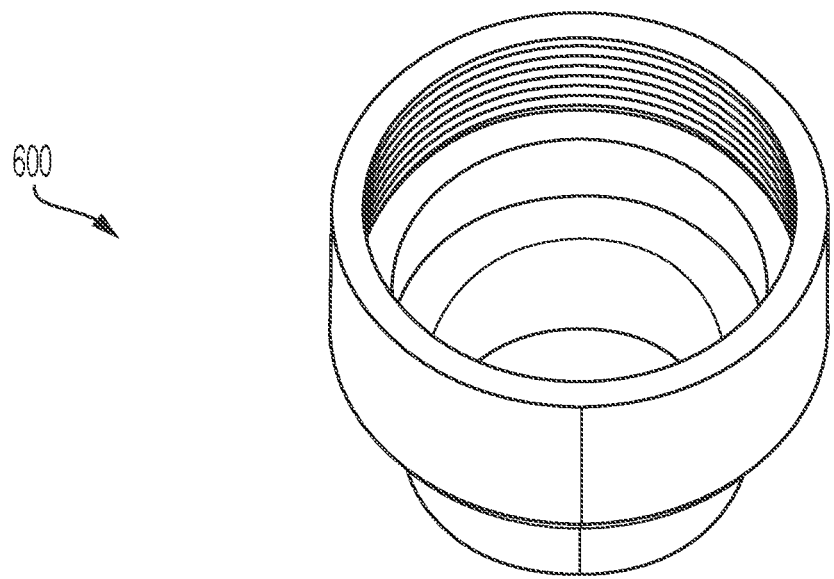
FIG. 33 is a diagram of a top perspective view of the press fit push seal pipe adapter 600.

FIG. 33 is a diagram of a top perspective view of the press fit push seal pipe adapter 600.

Figure 34:
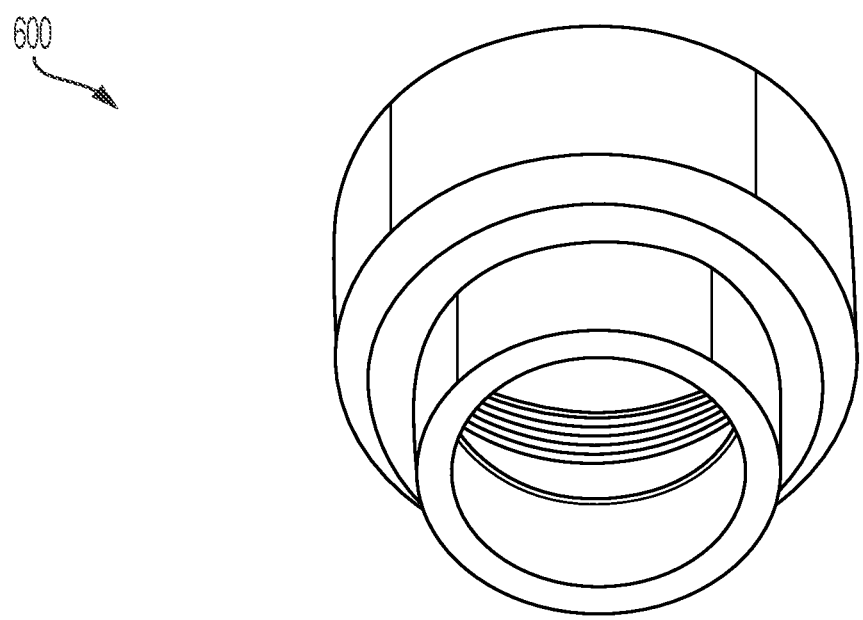
FIG. 34 is a diagram of a bottom perspective view of the press fit push seal pipe adapter 600.

FIG. 34 is a diagram of a bottom perspective view of the press fit push seal pipe adapter 600.

Figure 35:
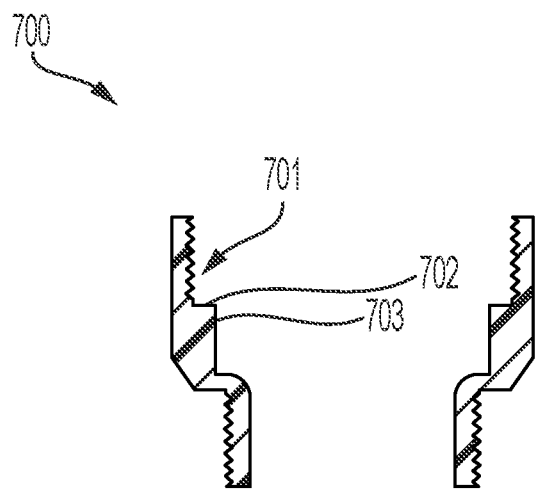
FIG. 35 is a diagram of a cross-sectional view of a threaded push seal pipe adapter 700.

FIG. 35 is a diagram of a cross-sectional view of a threaded push seal pipe adapter 700. The threaded push seal pipe adapter 700 has a first grommet contact surface 701, a second grommet contact surface 702, and a third grommet contact surface 703. A novel grommet in accordance with various embodiments above is inserted into the threaded push seal pipe adapter 700. When inserted, the grommet (not shown) is in contact and forms a seal with first grommet contact surface 701 and the grommet is in contact and forms a seal with the second grommet contact surface 702. After a pipe is inserted into the threaded push seal pipe adapter 700, the grommet contacts and forms a seal with third grommet contact surface 703. The grommet forms a seal with the pipe inserted into the threaded push seal pipe adapter 700.

Figure 36:
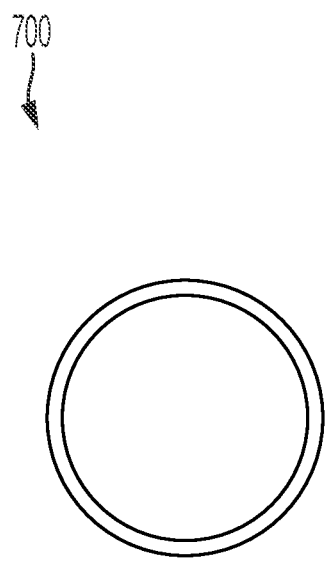
FIG. 36 is a diagram of a top cross-sectional view of the threaded push seal pipe adapter 700.

FIG. 36 is a diagram of a top cross-sectional view of the threaded push seal pipe adapter 700.

Figure 37:
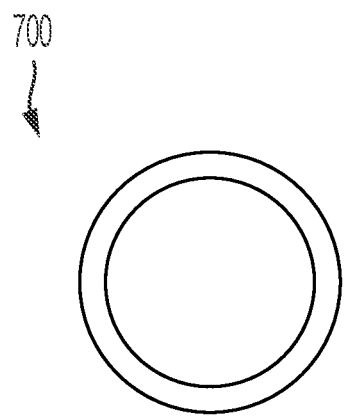
FIG. 37 is a diagram of a bottom cross-sectional view of the threaded push seal pipe adapter 700.

FIG. 37 is a diagram of a bottom cross-sectional view of the threaded push seal pipe adapter 700.

Figure 38:
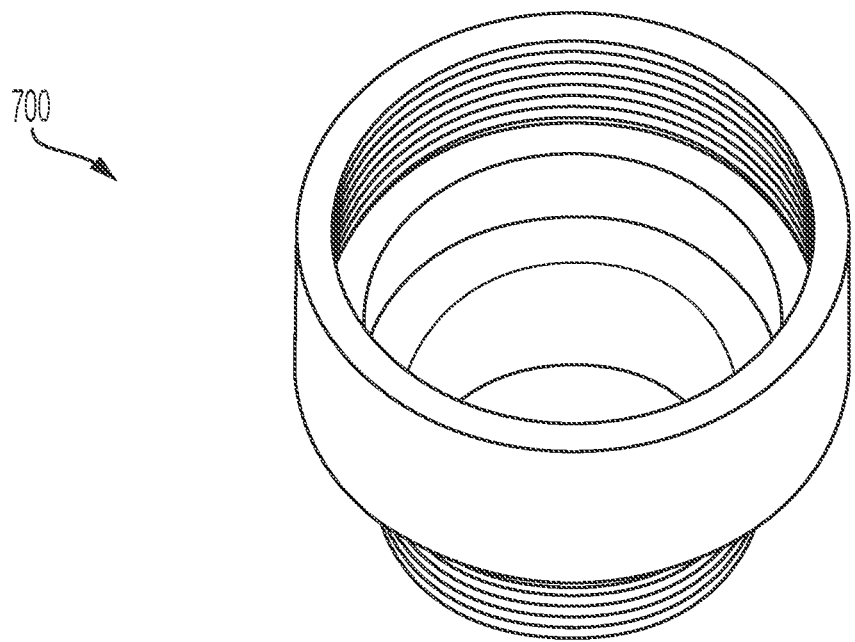
FIG. 38 is a diagram of a top perspective view of the threaded push seal pipe adapter 700.

FIG. 38 is a diagram of a top perspective view of the threaded push seal pipe adapter 700.

Figure 39:
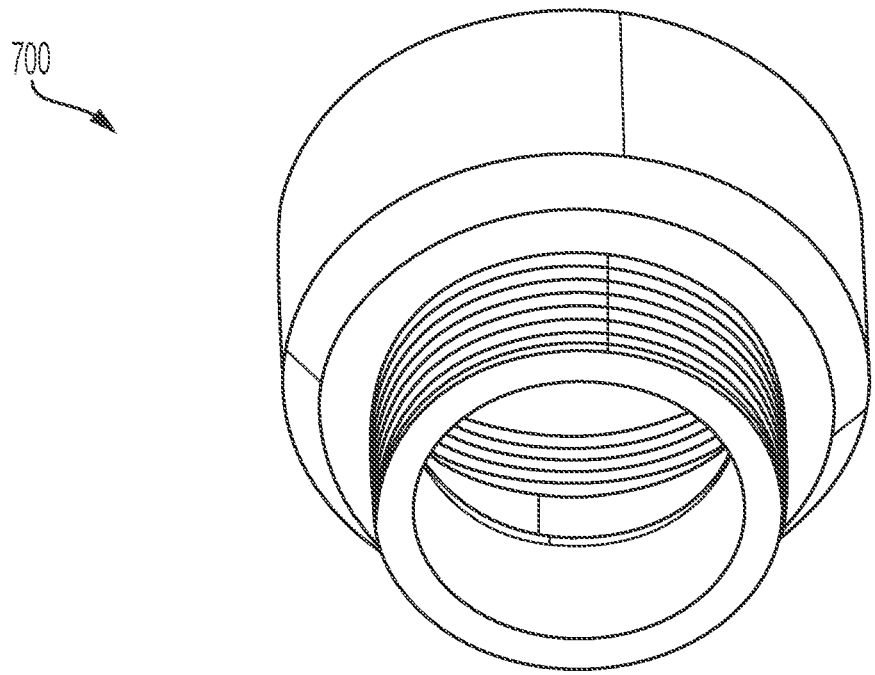
FIG. 39 is a diagram of a bottom perspective view of the threaded push seal pipe adapter 700.

FIG. 39 is a diagram of a bottom perspective view of the threaded push seal pipe adapter 700.

Figure 40:
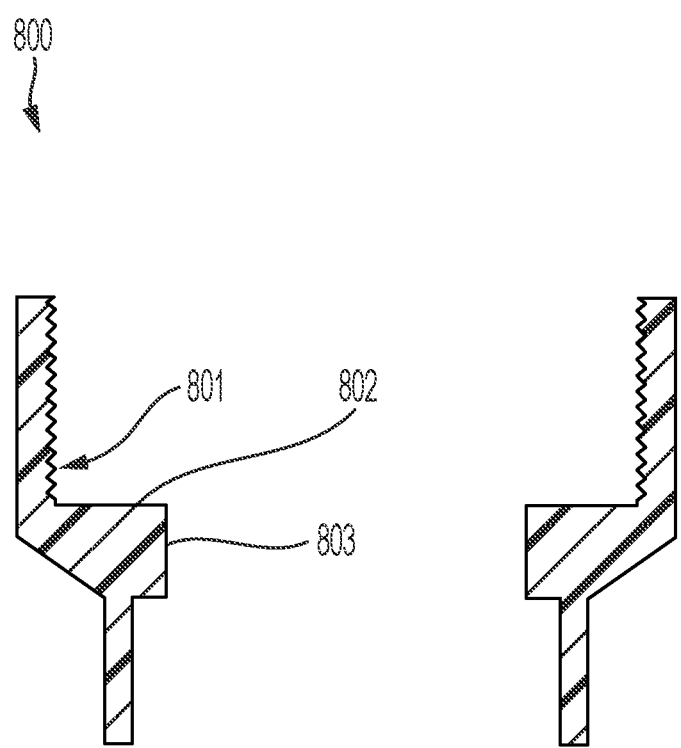
FIG. 40 is a diagram of a cross-sectional view of a press fit push seal pipe adapter 800.

FIG. 40 is a diagram of a cross-sectional view of a press fit push seal pipe adapter 800. The press fit push seal pipe adapter 800 has a first grommet contact surface 801, a second grommet contact surface 802, and a third grommet contact surface 803. A novel grommet in accordance with various embodiments above is inserted into the press fit push seal pipe adapter 800. When inserted, the grommet (not shown) is in contact and forms a seal with first grommet contact surface 801 and the grommet is in contact and forms a seal with the second grommet contact surface 802. After a pipe is inserted into the press fit push seal pipe adapter 800, the grommet contacts and forms a seal with third grommet contact surface 803. The grommet forms a seal with the pipe inserted into the press fit push seal pipe adapter 800.

Figure 41:
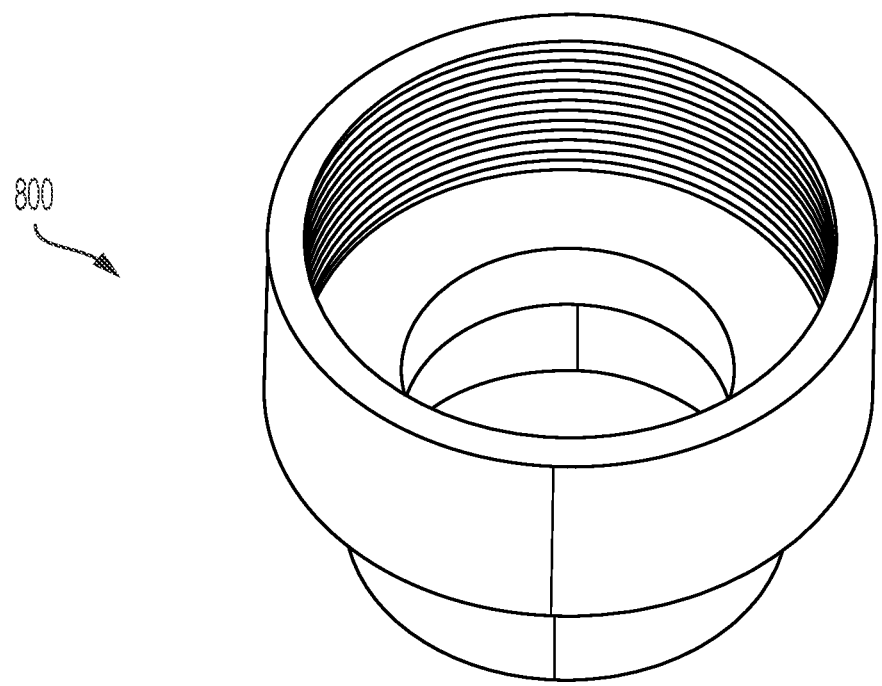
FIG. 41 is a diagram of a top perspective view of the press fit push seal pipe adapter 800.

FIG. 41 is a diagram of a top perspective view of the press fit push seal pipe adapter 800.

Figure 42:
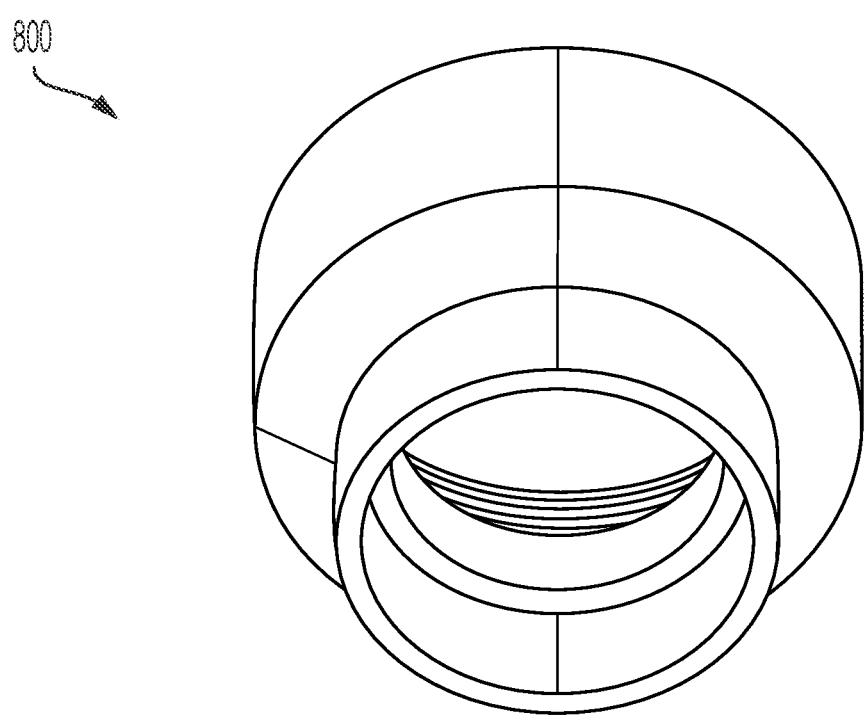
FIG. 42 is a diagram of a bottom perspective view of the press fit push seal pipe adapter 800.

FIG. 42 is a diagram of a bottom perspective view of the press fit push seal pipe adapter 800.

Figure 43:
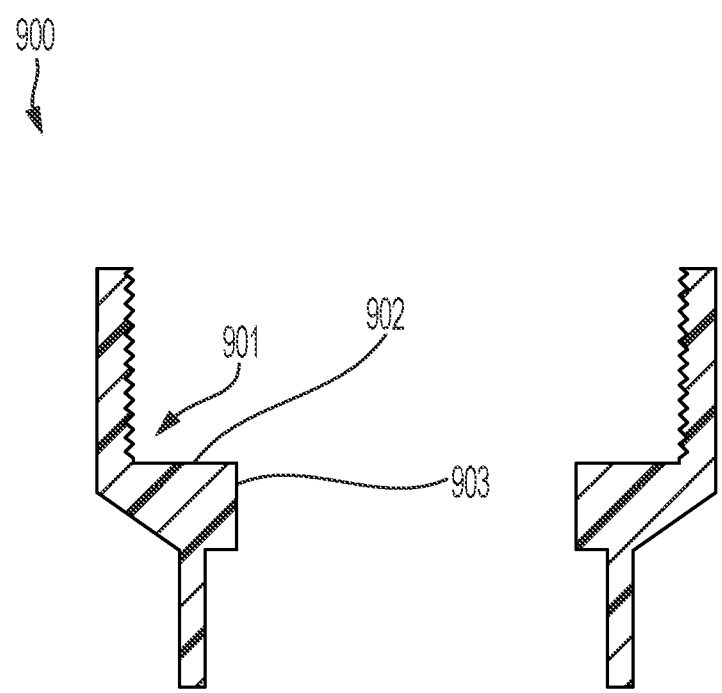
FIG. 43 is a diagram of a cross-sectional view of a press fit push seal pipe adapter 900.

FIG. 43 is a diagram of a cross-sectional view of a press fit push seal pipe adapter 900. The press fit push seal pipe adapter 900 has a first grommet contact surface 901, a second grommet contact surface 902, and a third grommet contact surface 903. A novel grommet in accordance with various embodiments above is inserted into the press fit push seal pipe adapter 900. When inserted, the grommet (not shown) is in contact and forms a seal with first grommet contact surface 901 and the grommet is in contact and forms a seal with the second grommet contact surface 902. After a pipe is inserted into the press fit push seal pipe adapter 900, the grommet contacts and forms a seal with third grommet contact surface 903. The grommet forms a seal with the pipe inserted into the press fit push seal pipe adapter 900.

Figure 44:
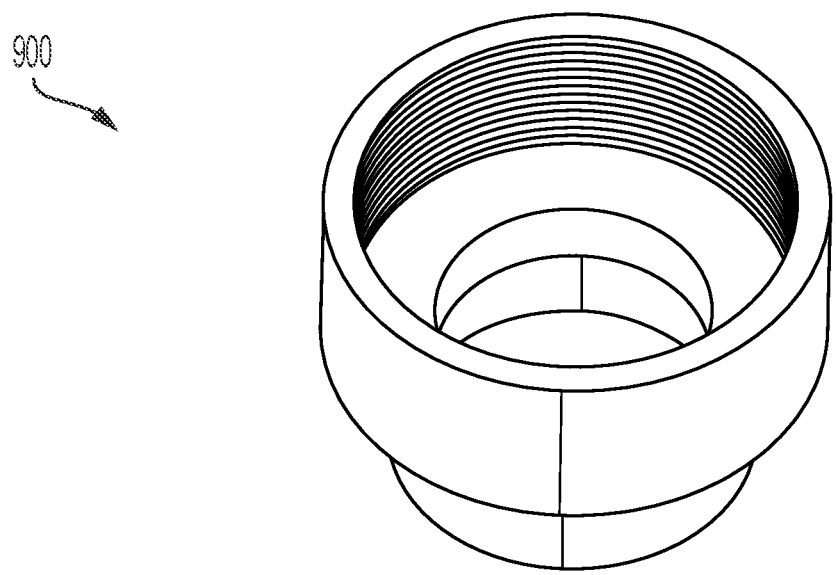
FIG. 44 is a diagram of a top perspective view of the press fit push seal pipe adapter 900.

FIG. 44 is a diagram of a top perspective view of the press fit push seal pipe adapter 900.

Figure 45:
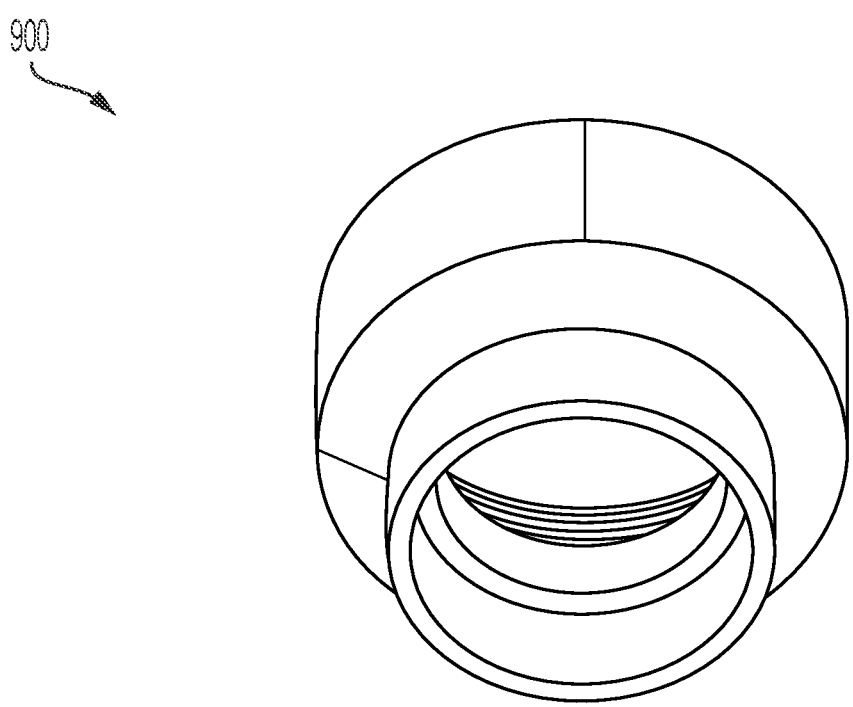
FIG. 45 is a diagram of a bottom perspective view of the press fit push seal pipe adapter 900.

FIG. 45 is a diagram of a bottom perspective view of the press fit push seal pipe adapter 900.

Figure 46:
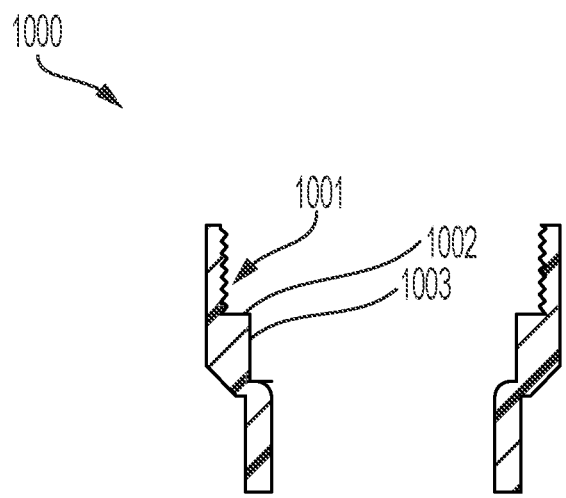
FIG. 46 is a diagram of a cross-sectional view of a press fit push seal pipe adapter 1000.

FIG. 46 is a diagram of a cross-sectional view of a press fit push seal pipe adapter 1000. The press fit push seal pipe adapter 1000 has a first grommet contact surface 1001, a second grommet contact surface 1002, and a third grommet contact surface 1003. A novel grommet in accordance with various embodiments above is inserted into the press fit push seal pipe adapter 1000. When inserted, the grommet (not shown) is in contact and forms a seal with first grommet contact surface 1001 and the grommet is in contact and forms a seal with the second grommet contact surface 1002. After a pipe is inserted into the press fit push seal pipe adapter 1000, the grommet contacts and forms a seal with third grommet contact surface 1003. The grommet forms a seal with the pipe inserted into the press fit push seal pipe adapter 1000.

Figure 47:
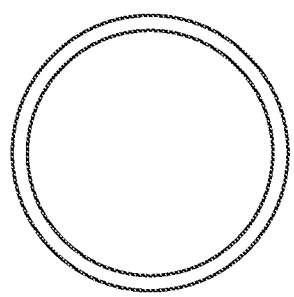
FIG. 47 is a diagram of a top cross-sectional view of the press fit push seal pipe adapter 1000.

FIG. 47 is a diagram of a top cross-sectional view of the press fit push seal pipe adapter 1000.

Figure 48:
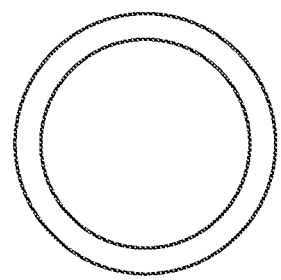
FIG. 48 is a diagram of a bottom cross-sectional view of the press fit push seal pipe adapter 1000.

FIG. 48 is a diagram of a bottom cross-sectional view of the press fit push seal pipe adapter 1000.

Figure 49:
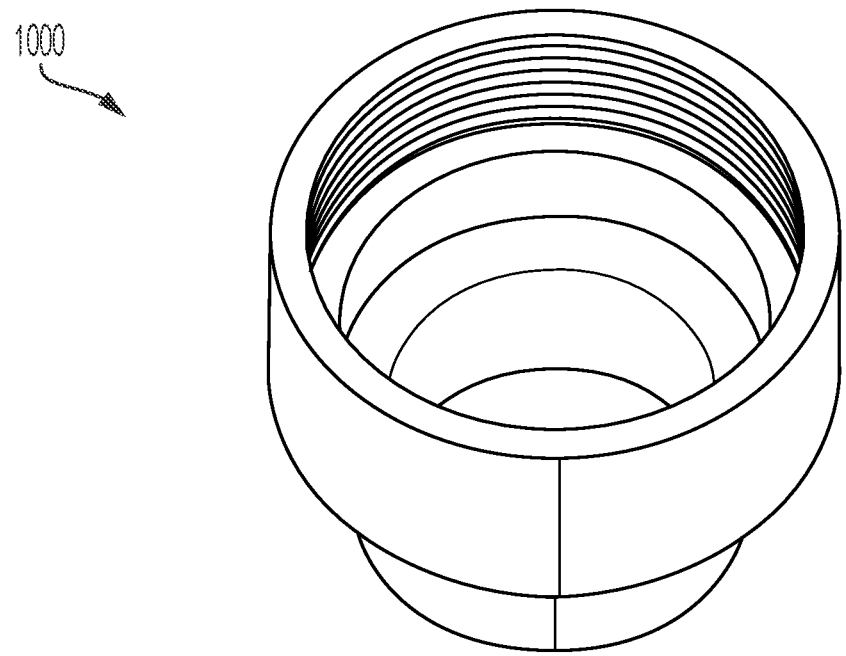
FIG. 49 is a diagram of a top perspective view of the press fit push seal pipe adapter 1000.

FIG. 49 is a diagram of a top perspective view of the press fit push seal pipe adapter 1000.

Figure 50:
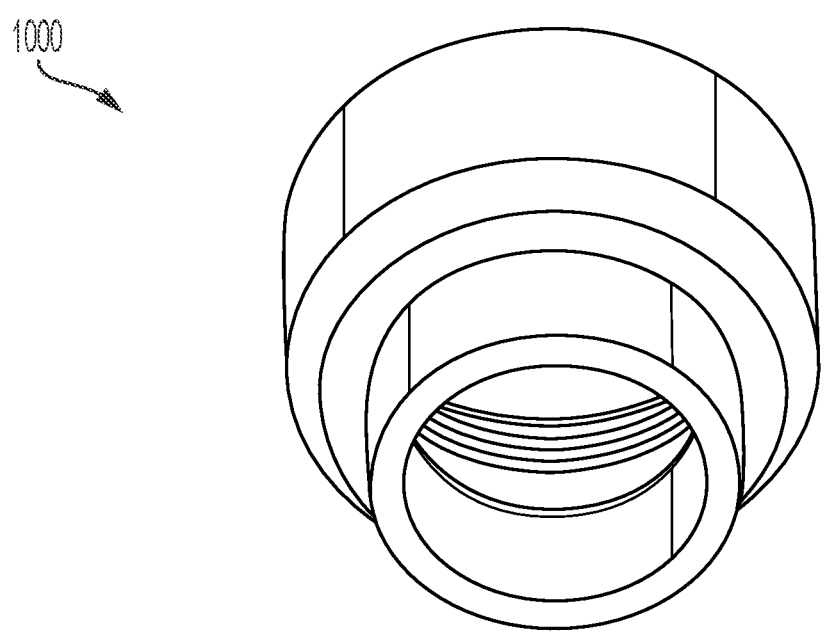
FIG. 50 is a diagram of a bottom perspective view of the press fit push seal pipe adapter 1000.

FIG. 50 is a diagram of a bottom perspective view of the press fit push seal pipe adapter 1000.

Figure 51:
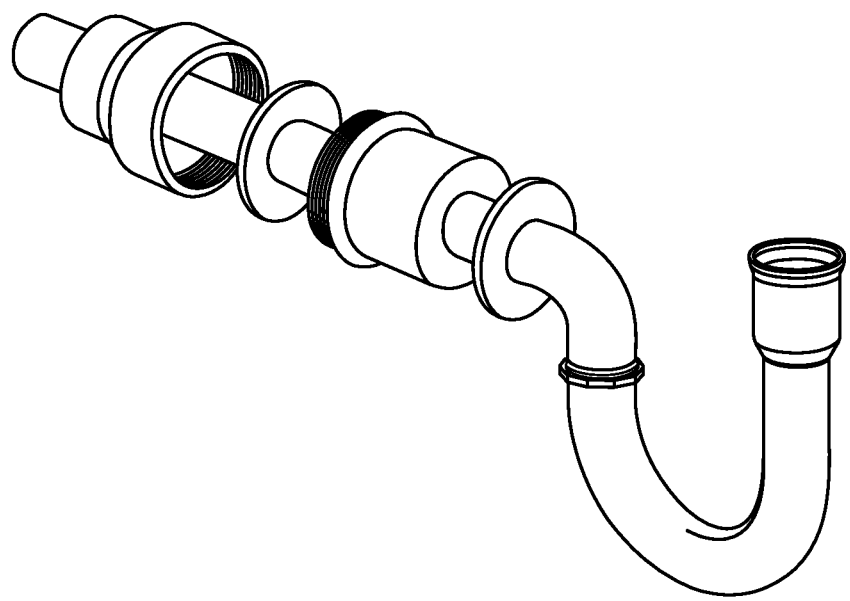
FIG. 51 is an exploded perspective view of a push seal pipe adapter attached to a U-bend trap.

FIG. 51 is an exploded perspective view of a push seal pipe adapter attached to a U-bend trap.

Figure 52:
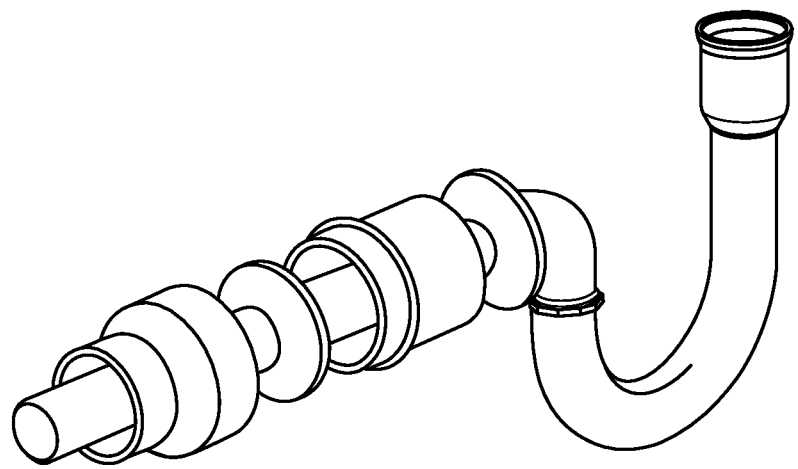
FIG. 52 is an exploded perspective view of a push seal pipe adapter attached to a U-bend trap.

FIG. 52 is an exploded perspective view of a push seal pipe adapter attached to a U-bend trap.

Figure 53:
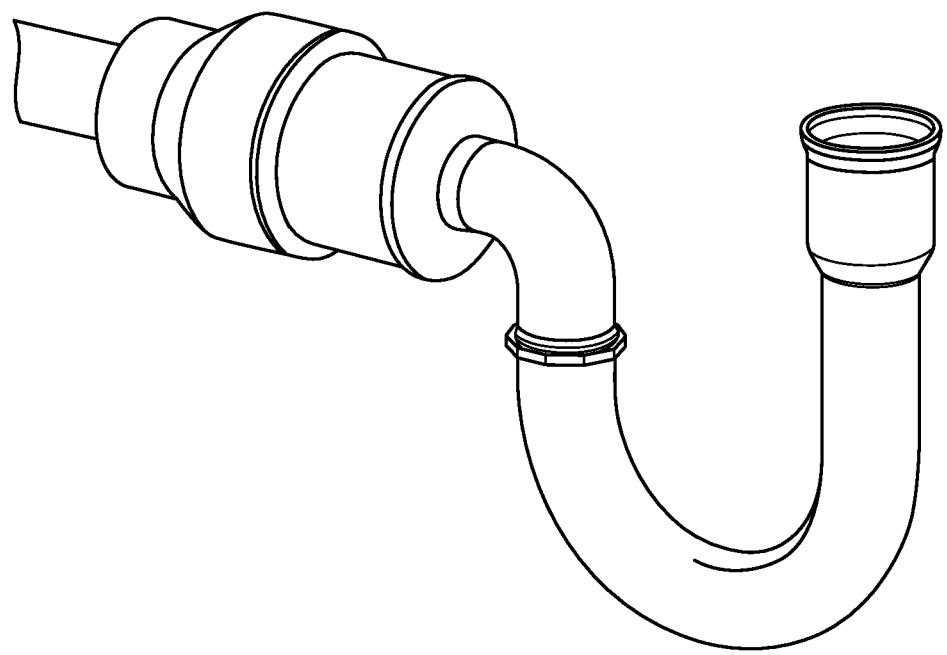
FIG. 53 is a perspective view of a push seal pipe adapter installed with a U-bend trap.

FIG. 53 is a perspective view of a push seal pipe adapter installed with a U-bend trap.

Figure 54:
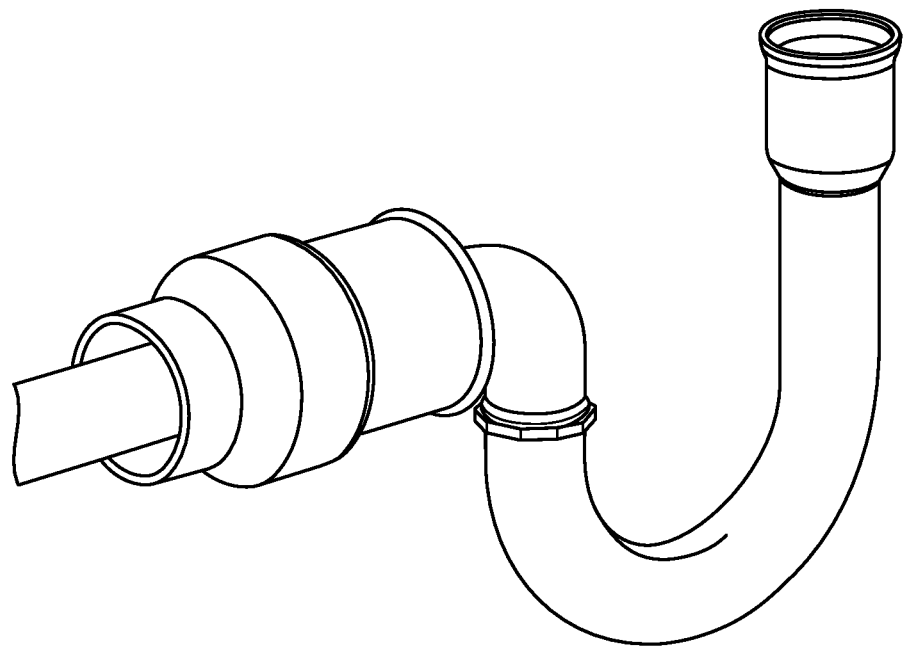
FIG. 54 is a perspective view of a push seal pipe adapter installed with a U-bend trap.

FIG. 54 is a perspective view of a push seal pipe adapter installed with a U-bend trap.

Figure 55:
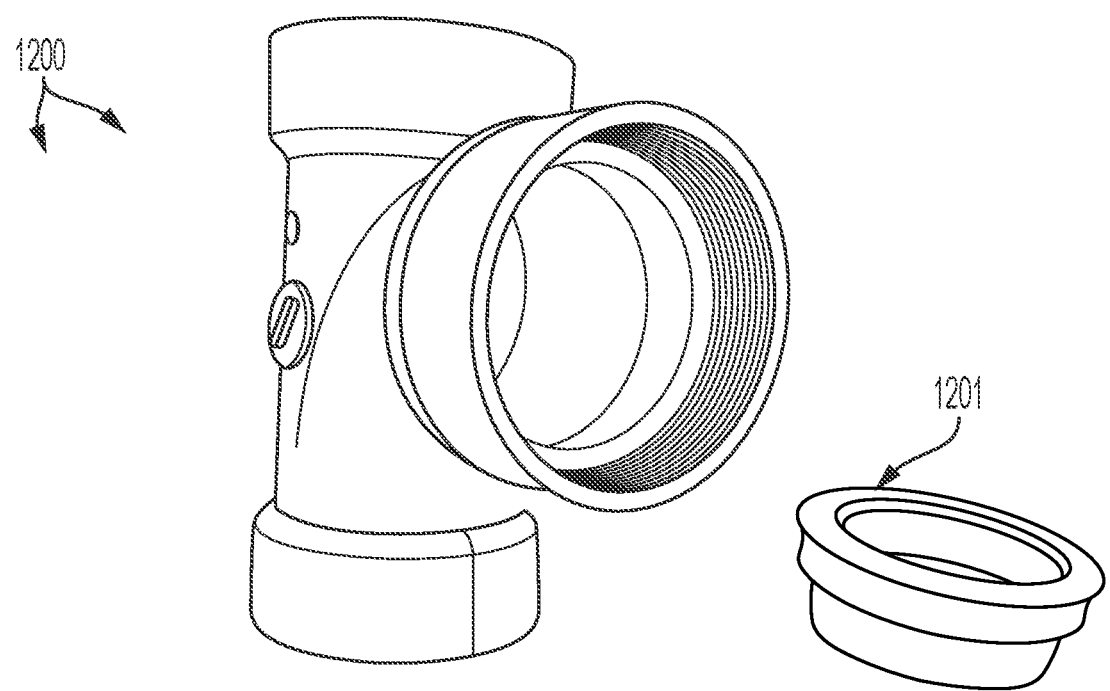
FIG. 55 is a perspective view of a push seal tee pipe adapter 1200 with grommet 1201 removed.

FIG. 55 is a perspective view of a push seal tee pipe adapter 1200 in accordance with another embodiment. The push seal tee pipe adapter 1200 includes a removable grommet 1201. In the example of FIG. 55, grommet 1201 is shown removed and outside of the push seal tee pipe adapter 1200.

Figure 56:
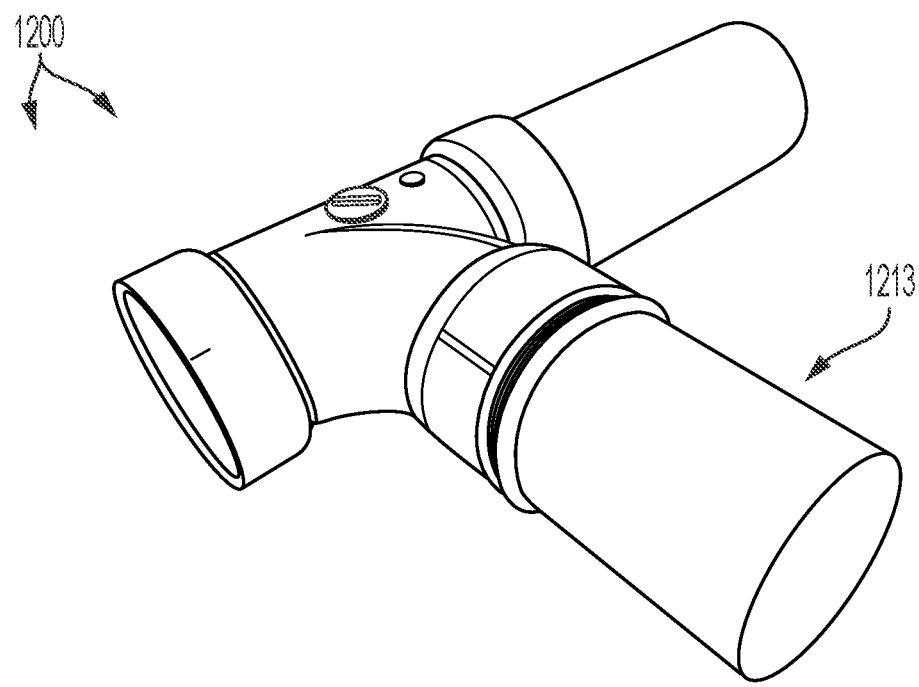
FIG. 56 is a perspective view of a push seal tee pipe adapter 1200 with test cap 1213 attached.

FIG. 56 is a perspective view of a push seal tee pipe adapter 1200 with test cap 1213 attached.

Figure 57:
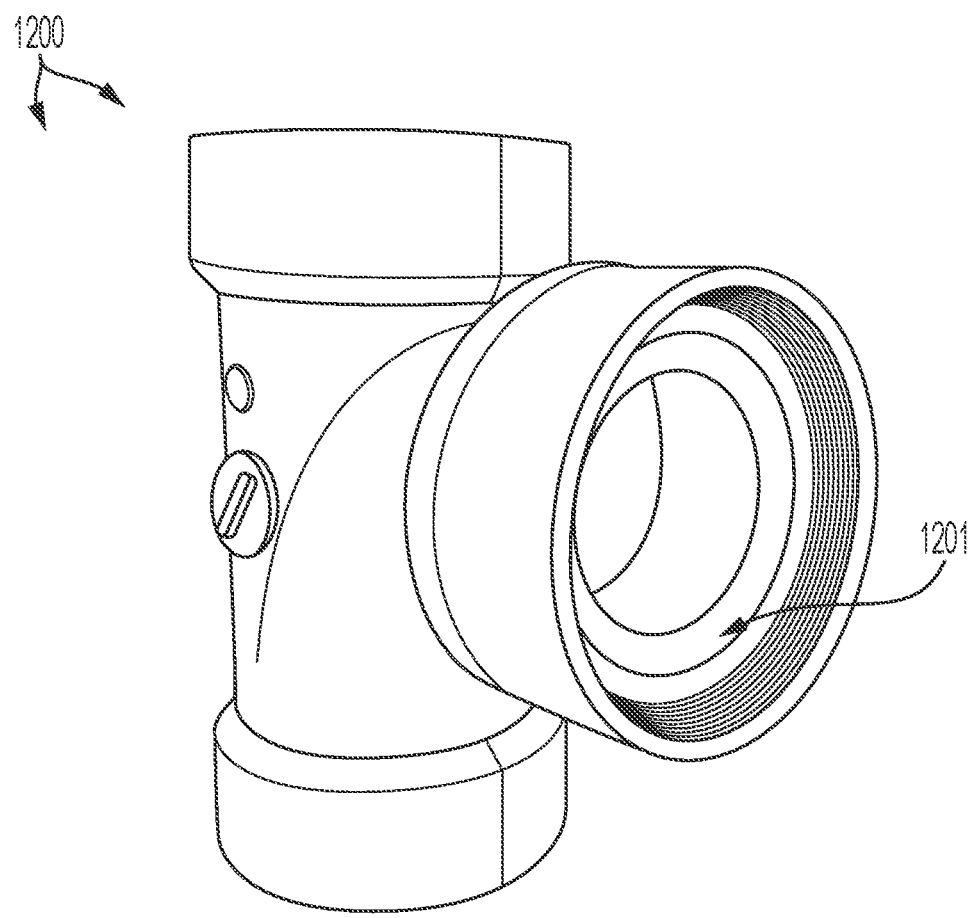
FIG. 57 is a perspective view of a push seal tee pipe adapter 1200 with grommet 1201 installed.

FIG. 57 is a perspective view of a push seal tee pipe adapter 1200 with grommet 1201 installed.

Figure 58:
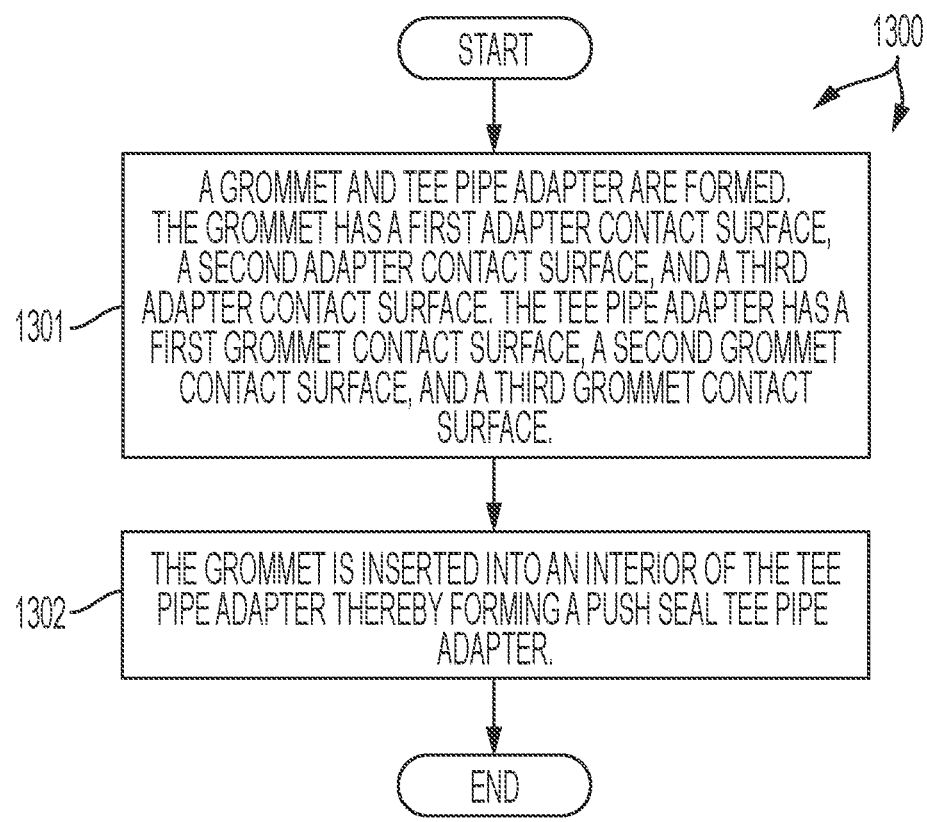
FIG. 58 is a flowchart of a method 1300 in accordance with one novel aspect.

FIG. 58 is a flowchart of a method 1300 in accordance with one novel aspect. In a first step (step 1301), a grommet and tee pipe adapter are formed. The grommet has a first adapter contact surface, a second adapter contact surface, and a third adapter contact surface. The tee pipe adapter has a first grommet contact surface, a second grommet contact surface, and a third grommet contact surface. In a second step (step 1302), the grommet is inserted into an interior of the tee pipe adapter, thereby forming a push seal tee pipe adapter.

Figure 59:
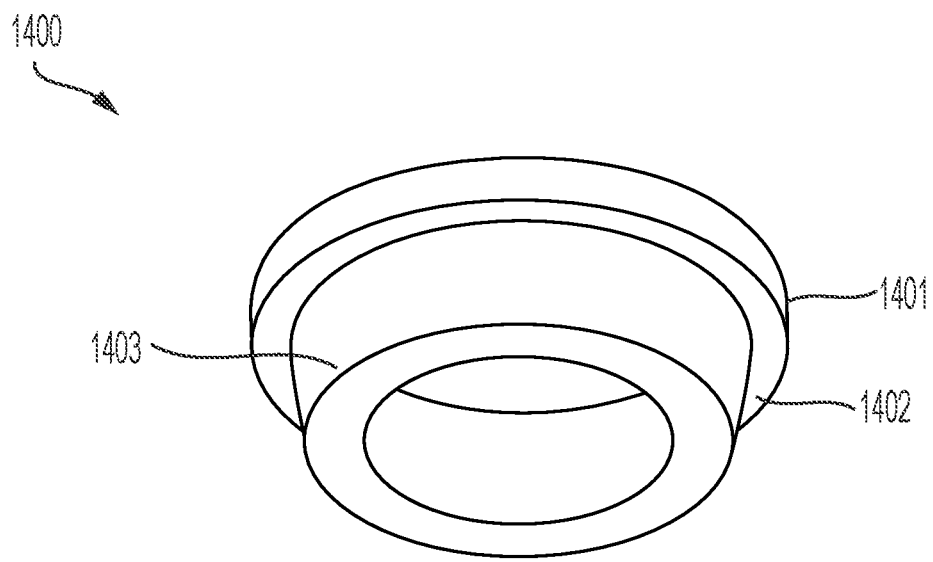
FIG. 59 is a diagram of a bottom perspective view of a grommet 1400.

FIG. 59 is a diagram of a bottom perspective view of a grommet 1400. The grommet 1400 has a first adapter contact surface 1401, a second adapter contact surface 1402, and a third adapter contact surface 1403.

Figure 60:
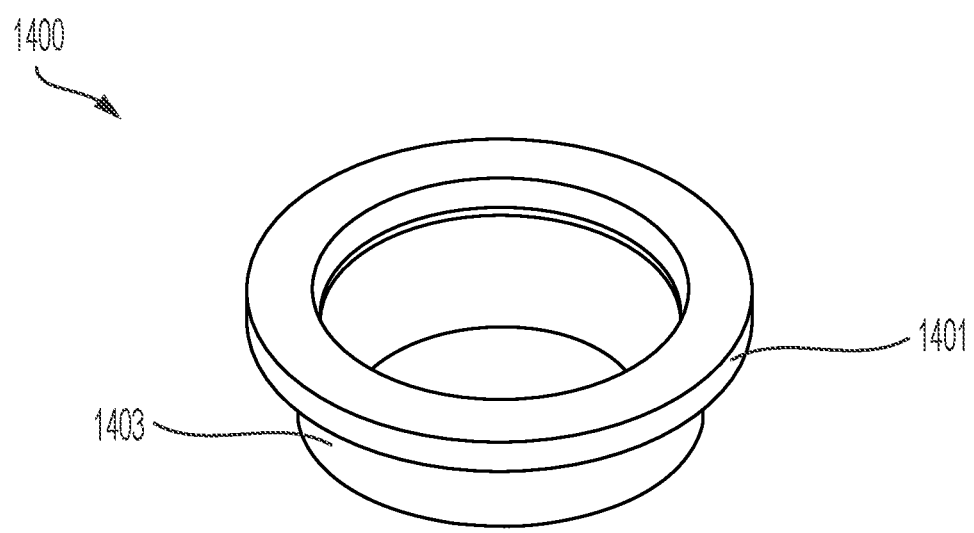
FIG. 60 is a diagram of a top perspective view of grommet 1400.

FIG. 60 is a diagram of a top perspective view of the grommet 1400.

Figure 61:
FIG. 61 is a diagram of a cross-sectional view of the grommet 1400.
Figure 61:
Figure 61:

FIG. 61 is a diagram of a cross-sectional view of the grommet 1400.

Although certain specific embodiments are described above for instructional purposes, the teachings of this patent document have general applicability and are not limited to the specific embodiments described above. Dimensions in inches are shown in various embodiments; however, it is understood that dimensions vary depending on application without departing from the scope of the claims. For example, in tub drain or sink drain applications, the pipe adapter dimensions will have different diameters. Accordingly, various modifications, adaptations, and combinations of various features of the described embodiments can be practiced without departing from the scope of the invention as set forth in the claims.

What is claimed is:

1. An apparatus, the apparatus comprising:
    a pipe adapter comprising (i) a first pipe coupling end configured to receive a first pipe, and (ii) a second pipe coupling end configured to receive a second pipe;
    wherein the pipe adapter comprises a passageway fluidly connecting the first pipe coupling end and the second pipe coupling end;
    a grommet disposed along the passageway of the pipe adapter between the first pipe coupling end and the second pipe coupling end and extending at least partially along the passageway of the pipe adapter;
    a test cap at least partially received at the first pipe coupling end and along the passageway of the pipe adapter and engaging the grommet at a position along the passageway that is spaced from the first pipe coupling end and the second pipe coupling end of the pipe adapter to secure the grommet within the passageway;
    wherein, with the test cap at least partially received at the first pipe coupling end and along the passageway of the pipe adapter and engaging the grommet, an end portion of the test cap is removable from a remaining portion of the test cap and the pipe adapter to allow the first pipe to be received at the first pipe coupling end of the pipe adapter;
    wherein, with the first pipe received at the first pipe coupling end of the pipe adapter, the first pipe is positioned along a passageway of the grommet; and
    wherein, with the first pipe positioned along the passageway of the grommet, the grommet is compressed between and seals against the first pipe and the pipe adapter.

2. The apparatus of claim 1, wherein the test cap is threadably received along the passageway of the pipe adapter.

3. The apparatus of claim 1, wherein the test cap is secured along the passageway of the pipe adapter via adhesive.

4. The apparatus of claim 1, wherein the grommet is compressed between and seals against the test cap and an annular flange of the pipe adapter.

5. The apparatus of claim 1, wherein the end portion of the test cap is closed to seal the pipe adapter when the test cap with the end portion is disposed at the pipe adapter.

6. The apparatus of claim 1, wherein the first pipe coupling end is opposite the second pipe coupling end.

7. The apparatus of claim 1, wherein the passageway of the pipe adapter comprises (i) a first passageway portion at the first pipe coupling end of the pipe adapter, the first passageway portion having a first diameter, and (ii) a second passageway portion having a second diameter that is less than the first diameter, and wherein a radially extending surface extends between an inner cylindrical surface at the first passageway portion and an inner cylindrical surface at the second passageway portion.

8. The apparatus of claim 7, wherein the radially extending surface comprises an annular surface.

9. The apparatus of claim 7, wherein the grommet comprises (i) a first portion that engages the radially extending surface, and (ii) a second portion extending from the first portion and at least partially along the second passageway portion.

10. The apparatus of claim 9, wherein the grommet is secured at the radially extending surface of the pipe adapter via the test cap, and wherein the first portion of the grommet is compressed between and seals against the test cap and the radially extending surface of the pipe adapter.

11. The apparatus of claim 10, wherein, with the grommet secured at the radially extending surface of the pipe adapter via the test cap, the first portion of the grommet radially expands and seals against the inner cylindrical surface at the first passageway portion.

12. The apparatus of claim 9, wherein, with the first pipe positioned through the passageway of the grommet, the second portion of the grommet is compressed between and seals against the first pipe and the inner cylindrical surface at the second passageway portion of the pipe adapter.

13. The apparatus of claim 9, wherein the second portion of the grommet extends partially along the second passageway portion of the pipe adapter, with a distal end of the second portion having a diameter that is less than a diameter of a proximal end of the second portion that is at the first portion of the grommet.

14. The apparatus of claim 9, wherein the second portion of the grommet comprises a conical surface that extends from an inner region of the first portion of the grommet, and wherein the conical surface of the grommet comprises (i) a first outer diameter at a first end of the conical surface at the inner region of the first portion, and (ii) a second outer diameter at a second end of the conical surface that is distal from the first end, and wherein the second outer diameter is less than the first outer diameter.

15. The apparatus of claim 7, wherein the passageway of the pipe adapter comprises a third passageway portion at the second pipe coupling end of the pipe adapter, the third passageway portion having a third diameter, and wherein the third passageway portion is configured to receive the second pipe.

16. The apparatus of claim 15, wherein the third diameter is greater than the second diameter.

17. The apparatus of claim 15, wherein the third diameter is less than the second diameter.

18. The apparatus of claim 1, wherein the second pipe is threadably received at the second pipe coupling end.

19. The apparatus of claim 1, wherein, with the end portion of the test cap removed, the remaining portion of the test cap remains along the passageway of the pipe adapter and engaging the grommet.

\* \* \* \* \*